No. 12,622. REISSUED MAR. 19, 1907.
H. C. GAMMETER.
DUPLICATING MACHINE.
APPLICATION FILED AUG. 20, 1904.
3 SHEETS—SHEET 1.
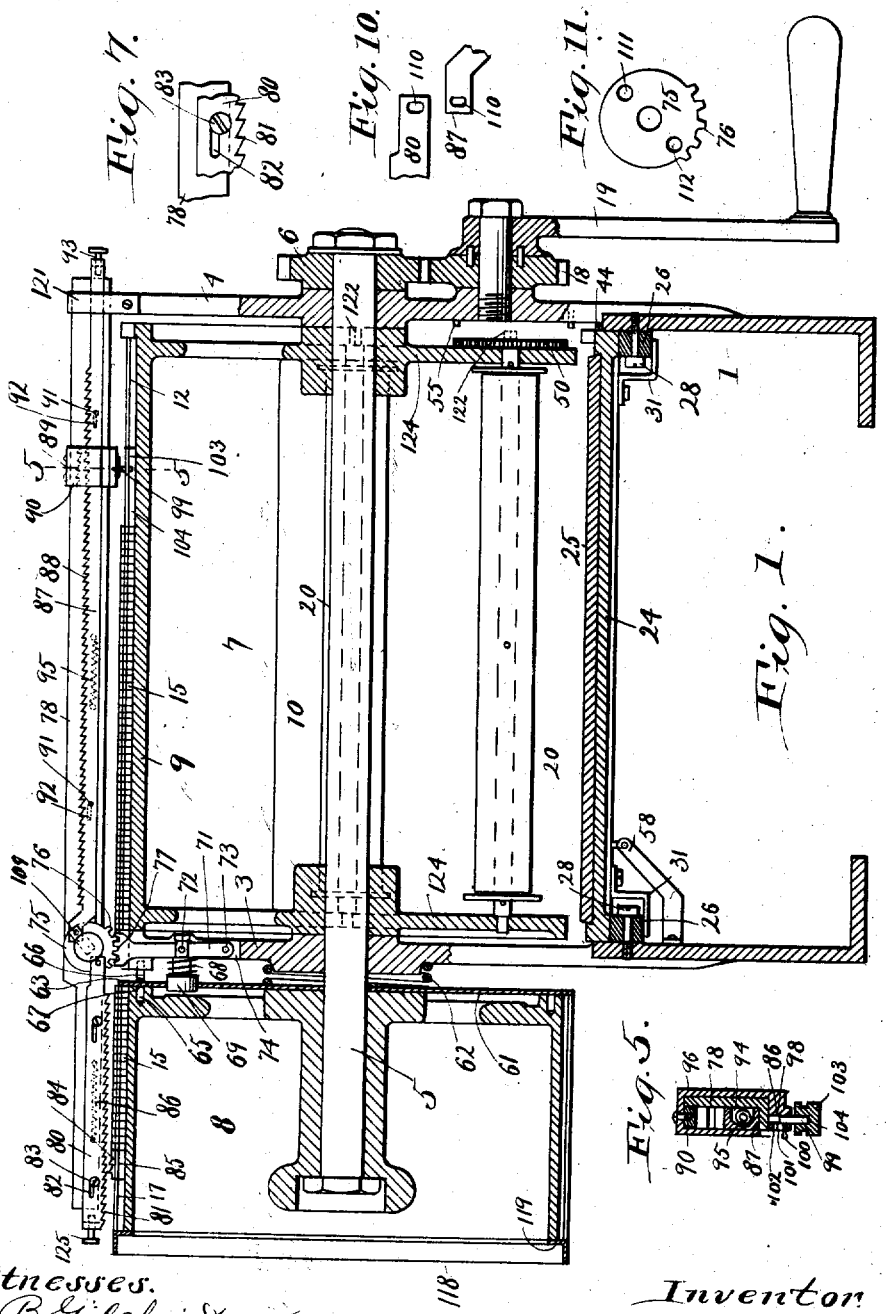
Witnesses.
E. B. Gilchrist
B. W. Brockett.
Inventor
Harry C. Gammeter,
By his Attorneys,
Thurston & Bates.

No. 12,622. REISSUED MAR. 19, 1907.
H. C. GAMMETER.
DUPLICATING MACHINE.
APPLICATION FILED AUG. 20, 1904.
3 SHEETS—SHEET 2.
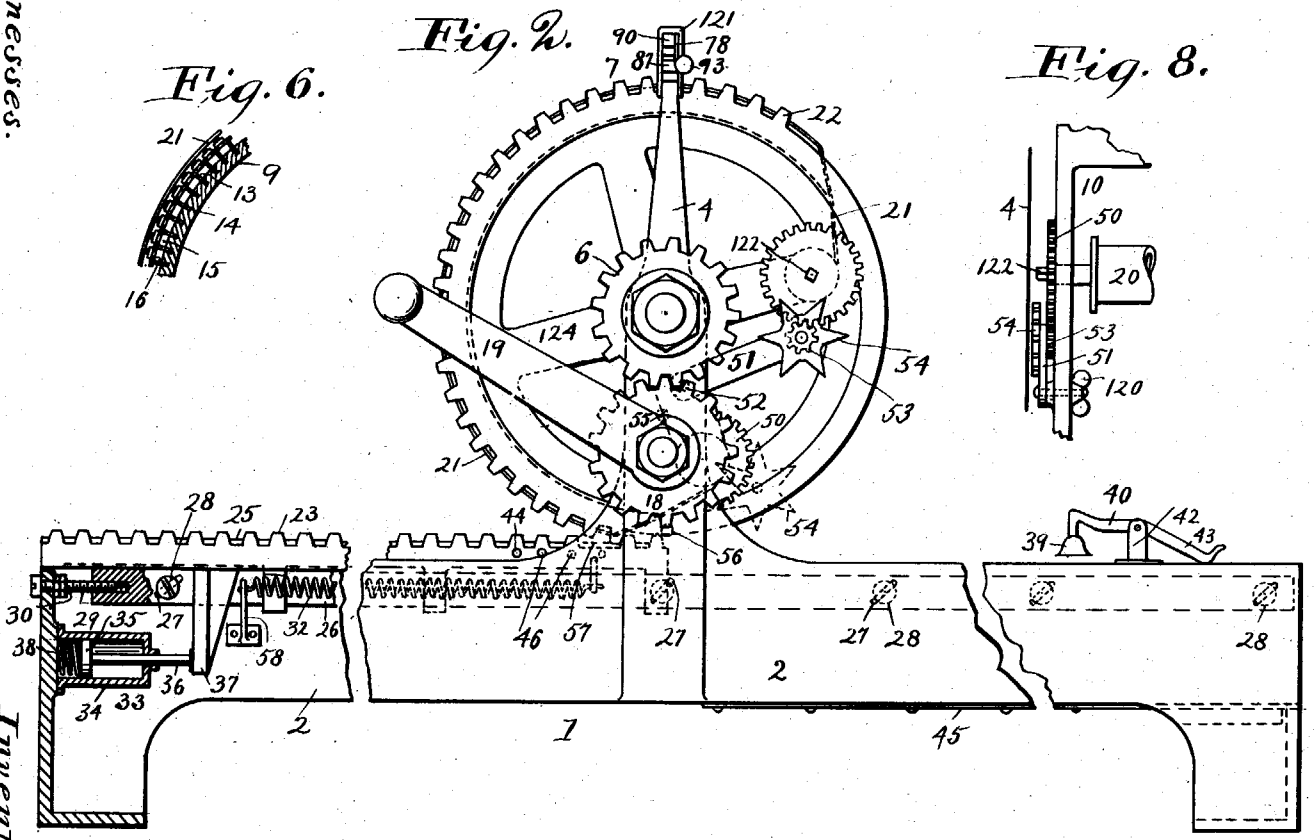
Witnesses.
E. B. Gilchrist
B. W. Brockett.
Inventor:
Harry C. Gammeter,
By his Attorneys,
Thurston & Bates.

No. 12,622. REISSUED MAR. 19, 1907.
H. C. GAMMETER.
DUPLICATING MACHINE.
APPLICATION FILED AUG. 20, 1904.
3 SHEETS—SHEET 3.
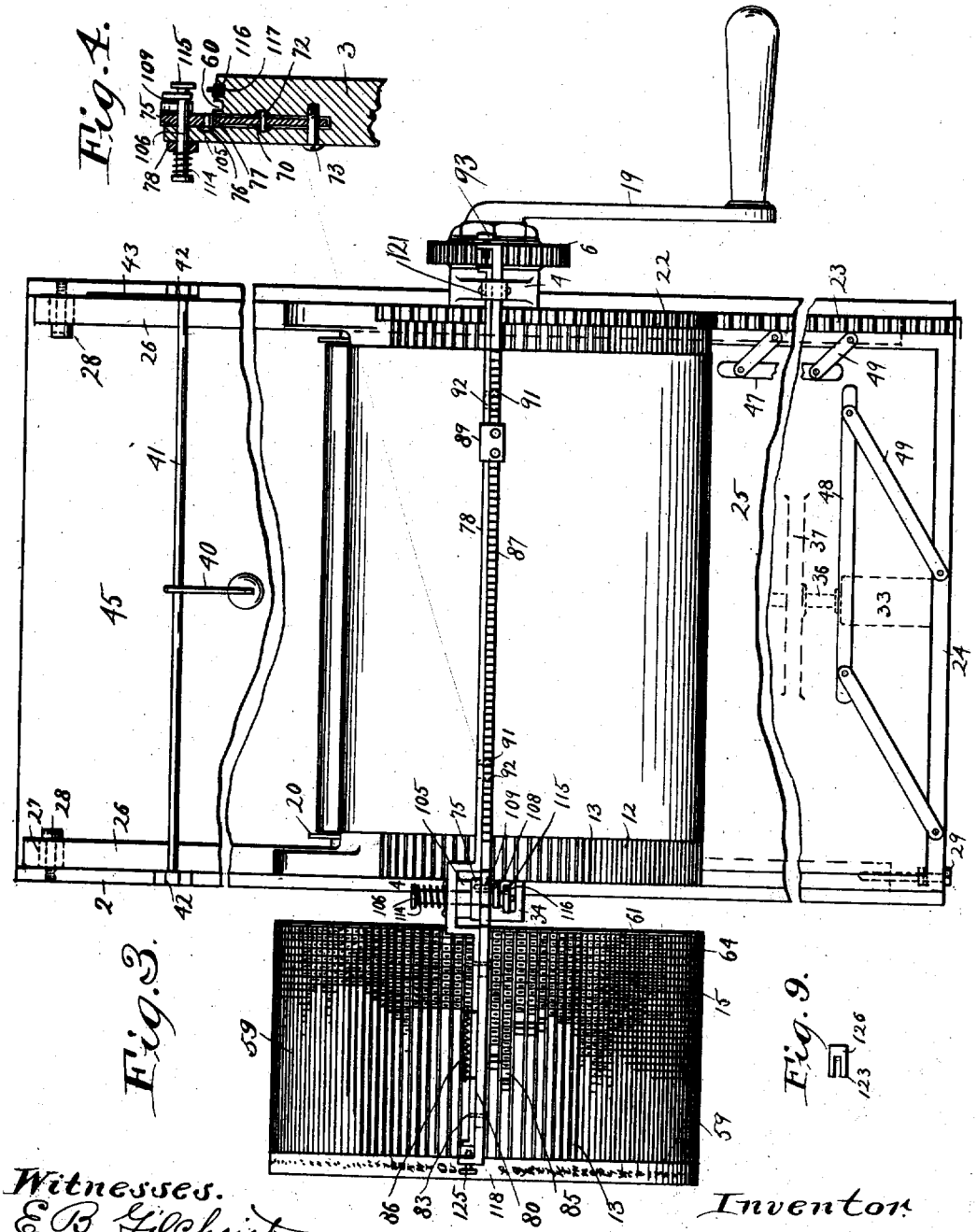
Witnesses.
E. B. Gilchrist
B. W. Brockett.
Inventor
Harry C. Gammeter,
By his Attorneys,
Thurston & Bates

UNITED STATES PATENT OFFICE.

HARRY C. GAMMETER, OF CLEVELAND, OHIO, ASSIGNOR, BY DIRECT AND MESNE ASSIGNMENTS, TO THE AMERICAN MULTIGRAPH CO., OF CLEVELAND, OHIO, A CORPORATION OF OHIO.

DUPLICATING-MACHINE.

No. 12,622. Specification of Reissued Letters Patent. Reissued Mar. 19, 1907.

Original No. 722,404, dated March 10, 1903. Application for reissue filed August 20, 1904. Serial No. 221,585.

*To all whom it may concern:*

Be it known that I, HARRY C. GAMMETER, a citizen of the United States, residing at Cleveland, in the county of Cuyahoga and State of Ohio, have invented a certain new and useful Improvement in Duplicating-Machines, of which the following is a full, clear, and exact description, reference being had to the accompanying drawings.

In business it is often desirable to reproduce circular letters or similar written matter in large quantities, and my invention relates to machines for this purpose. It is especially adapted for duplicating letters so that they have all the appearances of having been written upon a type-writer, with the incidental advantages.

That form of the machine to be described comprises two drums, distinguished as the printing-drum and the supply-drum. The former is adapted to have type set up upon it and is operated so that their impression is taken upon a sheet of paper. The supply-drum, as its name indicates, carries the type when not in actual use. These two drums may be on the same axis and are so constructed that they enable the type from the supply-drum to be passed to the printing-drum, automatic mechanism being provided for this purpose and for assisting in the proper distribution of the type upon the supply-drum after the operation. After assemblage upon the printing-drum an inking-ribbon, through which the impression is to be made, is passed across the type.

While the above summary sets out a preferred form of my machine, and the same is more fully exemplified in the following description, reference must be had to the claims for the various novel features of my invention.

In the drawings which fully illustrate my invention, Figure 1 represents a central cross-section of the same in a vertical plane. Fig. 2 represents the mechanism in side elevation, a portion of the frame being broken away to more fully disclose the interior construction. Fig. 3 represents the mechanism in plan, a portion being broken away, as indicated. Fig. 4 is a vertical cross-section taken between the two drums. Fig. 5 is a cross-section taken substantially on the line 5 5 of Fig. 1, but on enlarged scale. Fig. 6 represents in section a portion of the printing-drum. Fig. 7 represents, on an enlarged scale, a detail of a connection used in this machine. Fig. 8 is a detail elevation of certain feeding mechanism, the part in connection therewith being broken away. Fig. 9 is a side view of a keeper used for each line. Fig. 10 is a detail elevation, on an enlarged scale, of the inner ends of certain feeding-racks, and Fig. 11 is a detail elevation of a rock-wheel.

Referring by numerals to the parts shown in the drawing, 1 represents the frame, which comprises a substantially horizontal base or bed 2, provided on either side with upwardly-projecting standards 3 4. Upon these standards is mounted a horizontal shaft 5, which is provided at its outer extremity with a gear 6, which is rigid therewith. Upon this horizontal shaft 5 is mounted a rotatable drum 7, which will be described more in detail hereinafter. The inner extremity of this shaft is provided with another drum 8, which is rotatably mounted and capable of a limited sliding movement upon the shaft, for a purpose which will appear.

The drum 7, which I call the "printing-drum," comprises, substantially, spiders or ends 124, which are connected by a cylindrical portion or body 9. This cylindrical body is not, however, continuous, but is cut away on one side, as indicated at 10. Its outer face 11 is constructed substantially as indicated in Fig. 6. It is provided with longitudinal channels or ways 12, which extend from end to end, and which are formed between T-shaped strips 13, set tightly into narrow longitudinal grooves 14 in the face of the drum. Within these channels type 15 are carried, and each type is provided with grooves 16 at either side, which receive the slightly-projecting T-heads 17 of the aforesaid strips 13, wherefore they are maintained within the recess. This drum 7 is adapted to be rotated by means of a gear 18, which is rotatably carried by the aforesaid standard 3, and provided with a crank or handle 19.

Spools 20 carry between them a web or band 21, which passes around the channeled face 9 of the drum 7 and lies over the printing-faces of the type 15, which project, as indicated, slightly above the face of the drum. The width of this band is great enough to substantially cover the printing-face of the drum. It is constructed of some suitable transfer material, such as fabric, which has absorbed ink and is similar to an ordinary type-writer ribbon.

One end of the drum is provided for a portion of its periphery (which portion corresponds, substantially, with the printing-face of the drum) with gear-teeth 22, which are adapted to engage with a rack 23 on the carriage 24, which is mounted horizontally in the aforesaid bed 2.

Now from the construction described it will be readily understood that when the crank 19 is turned the drum 7 will be rotated, and at the same time the carriage 24 will pass beneath the drum and will slide toward the opposite end of the bed, and when the carriage passes in this manner a platen 25 on the carriage will be impressed by the projecting faces of the type carried on the face of the drum 7; but it will be remembered that the band 21, which has already been described, passes about this drum 7 and rests upon the printing-face of the type, and hence if a piece of paper were placed upon the platen 25 it would be impressed by the type and correspondingly printed. This platen projects above the face of the carriage, as indicated, and is preferably made of rubber of slight elasticity. In order to prevent any possibility of the teeth upon the rack 23 jamming and not coming into proper mesh with the gear-teeth 22 on the drum, I prefer to omit one of the teeth of the rack, as indicated at 57.

In Figs. 1 and 2 the construction of the bed 2 and the arrangement of the parts in connection with the carriage are most clearly shown. It will be observed that on its inner sides the bed is provided with longitudinal horizontal guide-bars 26, and the aforesaid carriage 24 rests upon their upper faces and between the inner faces of the bed 2. These bars 26 are provided at intervals along their length with inclined slots 27, through which screws 28 pass and secure them to the side of the bed.

It is desirable that the carriage should be capable of certain vertical adjustment, so that the position of the platen 25 may be that which is adapted for producing the best impressions of the type upon the sheet according to the thickness of the paper used. For this purpose the aforesaid inclined slots 27 were provided. By means of adjusting-screws 29, mounted longitudinally in the ends of the bars 26 at the end of the bed, this adjustment of the carriage is effected. This construction is most clearly shown in Figs. 2 and 3. Check-nuts 30 prevent accidental displacement of the carriage after adjustment. Upon its lower side the carriage is provided with small brackets or clips 31, which project so as to engage the lower face of the aforesaid guide-bars 26, so that the carriage 24 is held down upon the bed. A helical spring 32 operates to maintain the carriage normally in the extreme position, (shown in Fig. 2,) one end of this spring being secured to a bracket 58, carried by the bed. It will be observed also from an inspection of this figure that the gear-teeth 22 do not extend completely around the periphery of the drum 7. Hence it will appear that after a certain amount of rotation of the drum has taken place the rack 23 will pass out of engagement with these teeth, whereupon it will be returned by the spring 32 to the normal and extreme position in which it is shown. The arrangement, however, is such that this return does not take place until the carriage has passed sufficiently far beneath the drum 7 to take the impression of all the matter set up upon its face.

In order to prevent any ill effects which might arise from the sudden or violent return of the carriage 24 by the spring 32, the dash-pot 33 is provided, preferably secured to the end of the bed 2, as indicated. It consists, substantially, of a horizontal cylinder 34, in which is mounted a loosely-fitting piston 35, the rod 36 of which projects horizontally and is adapted to abut the downwardly-projecting bracket 37, carried by the lower side of the carriage 24. A spring 38 operates to force this piston outwardly to an extreme position when the table has passed to its outward position. By this arrangement the table is brought to rest quickly, but gently and easily, so that no jar is given to the mechanism.

It should now appear that if the handle 19 be continually turned in one direction the drum 7 will be rotated and the table will pass beneath the drum in rapid succession, being always returned by the spring 32 as soon as it becomes free of the gear-teeth 22. Hence if blank sheets be laid upon the platen one at a time they will receive a printed impression as fast as the drum can be rotated.

Means are provided for removing each of the sheets after it has been impressed. This is preferably accomplished by means of a vacuum-cup 39, which is carried by an arm 40, as indicated. This arm 40 is itself carried upon the rock-shaft 41, which passes across above the bed of the machine, being supported in brackets 42, secured to the sides of the bed. At one of its extremities, preferably the one which is on the same side as the rack, the rock-shaft 41 carries a trip-lever 43, which inclines downwardly, as indicated, so that it may contact with a pin 44, which projects outwardly from the side of the rack 23. When this pin presses the lever upward, the vacuum-cup, which is formed, preferably, of rubber, is depressed and forced downward upon the printed sheet lying upon the table. When the table commences to move back to its normal position, the vacuum-cup prevents the return of the sheet of printed matter, and when the table passes from beneath it the vacuum is broken by air entering the cup around its edges. The printed sheet then falls upon the plate 45, which extends across the bed at this point, as indicated.

In order to provide for changing the time which the vacuum-cup is depressed, the rack 23 is provided with several holes 46 at different positions, any of which is adapted to receive the aforesaid pin 44. Proper alinement or register of the paper is effected by providing flat strips 47 48, which are arranged to move in parallelism, respectively, with the longitudinal and transverse edges of the carriage. They are pivoted to the edge of the table on parallel arms 49.

Provision is made for feeding the band 21 automatically between the aforesaid spools 20. For this purpose, as clearly indicated in Figs. 2 and 8, the extremity of the spindle of each spool is provided with a gear-wheel 50, which lies at the end of the drum 7, and an arm 51, which is pivoted to the drum at 52, carries a small pinion 53, the teeth of which are adapted to mesh with the teeth of either of the gears 50. This pinion 53 is rigid with a star-wheel 54, and if the arm 51 be secured in the position shown in full lines in Fig. 2 once in every revolution of the drum the star-wheel will come into contact with the pin 55, carried by the standard 4, and this operates to give the star-wheel a partial rotation, which is transmitted to the spools and effects an intermittent feeding of the band 21. If the arm 51 be thrown to such a position that the star-wheel will appear where it is shown in dotted lines in Fig. 2 during the rotation of the drum, the star-wheel will then contact with a second pin 56, and this contact will operate to produce an intermittent feeding of the band in the opposite direction. A thumb-nut 120 affords means for locking the arm 51 in either of the positions described. It will be observed that at the moment the advance is given to the star-wheel the printing-drum is not in contact with the platen, and hence no resistance is offered to the movement of the band.

Proceeding now to a description of the mechanism for setting up the type on the printing-drum, it will be observed that the supply-drum 8, to which reference has already been made, is provided with channels 59, which are in all respects similar to the channels 12, formed upon the face of the printing-drum 7. In these channels 59 are carried type arranged in rows of the same letters or characters.

Referring especially to Figs. 1 and 4, it will appear that the upper extremity of the upright 3 is provided with a horizontal slot 60, which is of substantially the same depth and width as the channels of the two drums 7 and 8. By rotating the drums any channel of either drum may register with this slot. Hence it will appear that if the printing-drum were held so that any particular slot or channel remained in register with this slot the supply-drum could be turned to successive positions, so that the different type-rows would be brought into alinement with the slot. Briefly, that is the way the type are set.

The inner ends of all the channels of the supply-drum are closed by a disk 61, which rests against the inner face 64 of the supply-drum in the manner indicated and is maintained against it by a helical spring 62, which thrusts against it around its center. This disk, however, does not turn with the supply-drum, and in order to enable the type to pass it it is provided with an opening 63, which alines with the aforesaid slot 60. The inner face of the supply-drum is provided with small openings 65, which are adapted to receive a small pin 66, which projects outwardly from the side of the upright standard 3. There are as many of these openings 65 as there are channels in the supply-drum, and when any channel of the supply-drum is in alinement with the aforesaid slot 60 an opening corresponding to this channel is then in alinement with the aforesaid pin 66. The extremity of this pin 66 is preferably conical or pointed, as shown at 67, and lies close to the face of the supply-drum, so that a slight movement of the supply-drum along the shaft 5 inwardly would operate to bring the pin and opening into engagement.

From the above-described arrangement it will be understood that when the supply-drum has been turned to bring a certain channel substantially into alinement with the slot 60 it is made to aline exactly with the slot by moving the supply-drum laterally along the shaft, so that the pin and recess engage in the manner which has been described.

Mechanism is provided from one drum to the other to effect the automatic passage of the matrix through the slot 60. Such mechanism, comprising, as shown, feed-racks over each drum and means for moving each rack toward the opposite drum, will now be described.

The upright 3 carries, as indicated, a horizontal stationary feed-bar 78, which extends longitudinally of the machine above both the supply-drum and the printing-drum. One of its extremities rests upon the top of the standard 4, where it is secured by a strap 121. That portion of this bar which lies over the supply-drum supports a horizontal supply feed-rack 80, the lower edge of which is provided with teeth 81, which are shaped substantially as shown, and this feed-rack is provided with slots 82, which surround pins 83, carried by the aforesaid horizontal bar. As indicated in Fig. 7, one extremity of these slots inclines downwardly, so that if the feed-rack were given an inward longitudinal movement with respect to the feed-bar it would be lowered and then advanced horizontally. When this takes place, the teeth 81 engage with the upwardly-projecting teeth 84, which are integral with the chaser 85, carried in each of the channels of the supply-drum. These chasers are formed at their bases similarly to the type, so that they are retained by the channels. As stated, one is provided behind the innermost matrix in each row, so that they can operate to force the entire row outwardly when the feed-rack is actuated. A spring 86 normally constrains this feed-rack 80 in an extreme position, and an adjusting-screw 125, carried by it, is adapted to contact with the extremity of the feed-bar and limit the advance of the rack. In this manner the amount of advance of the chaser 85 can be accurately determined beforehand, and it is needless to say the amount of this advance should be exactly the width of one type, the type being all of one width.

That portion of the feed-bar which lies over the printing-drum is provided with a horizontal face 86, as indicated in Fig. 5, and upon this face rests a distributing feed-rack 87, which is in many respects similar to the supply feed-rack, which lies over the drum. As indicated, however, the teeth 88 upon this feed-rack are upon its upper edge and inclined toward the supply-drum. The thickness of this rack is such that its upper face is flush with the face of the feed-bar, as indicated. Upon this feed-bar 78 and surrounding the rack is mounted a rider 89, which is provided with a small block 90, having teeth on its lower face which project downward and incline in the opposite direction from those of the feed-rack. The construction of this rider will be described more in detail later. Its function is to assist in bringing about the removal of the type from the channels of the printing-drum when they are being distributed back upon the supply-drum. To this end, the rack 87 is provided with pins 91, which project into a slot 92, formed in the feed-bar. These slots are inclined downwardly at one extremity in a manner similar to the slots in the feed-rack 87 over the supply-drum. Now if this feed-rack 87 were given a movement in the direction of the supply-drum the pins 91 which it carries would ride up in the slots 92 and elevate the rack, after which it would move on horizontally. The rise of the rack is sufficient to bring about the engagement of its teeth with the teeth carried by the block 90 of the rider and slides the rider along the feed-bar 78. Arrangements are made for limiting the amount of advance of this rider, as indicated at 93, which arrangements are similar to those adopted at the opposite extremity of the feed-bar, and which have already been described.

At a point substantially near its middle the distributing feed-rack 87 is provided with a recess 94, as clearly shown in Fig. 5, in which is mounted a small helical spring 95, which constrains the rack normally in an extreme position, in which it is shown.

Proceeding now to a more detailed description of the rider and mechanism connected with it and referring especially to Fig. 5, it will appear that this rider includes a yoke 96, surrounding the feed-bar and having beneath the feed-rack an enlarged head 97, which head is provided with a small vertical opening or bore 98. In the bore is mounted slidably a small bolt 99, provided with a laterally-projecting pin 100, which passes out through a vertical slot 101 in the head, as indicated. This slot is further provided at its upper extremity with a lateral notch or recess 102, into which the aforesaid pin 100 may be moved, so that the bolt will be maintained in an elevated position. The pin affords means for raising the bolt, as will be readily understood.

A chaser 103 lies in the channel just below the rider, and it is provided with a vertical bore 104 on the upper side, which is adapted to be engaged by the aforesaid bolt 99, wherefore movement of the rider can be transmitted to it, as indicated. The base of this chaser is constructed in a manner substantially similar to that of the type, so that it is retained in the channels. Every channel of the printing-drum carries one of these chasers, and it may be well to say that they do not project from the drum as far as the face of the type, so that they do not operate to produce impressions through the inking-band.

It should be understood that the bolt 99 in no way interferes with the rotation of the printing-drum, because whenever necessary it can be raised and locked in the elevated position, as described, where it will be out of danger of contact with the face of the drum.

Recurring to the mechanism for automatically moving the rack for the purpose of effecting the feeding of the type, it will appear that the upright 3 is provided with an upward extension or head 105, and an arbor 106 passes through this head and the aforesaid feed-bar 78. Upon this arbor is loosely mounted a rock-wheel 75. As viewed in Fig. 4, the right-hand extremity of this arbor 106 carries a short radial arm 108, which arm is provided with a laterally-projecting pin 109. This pin 109 is adapted to pass through a small elongated opening 110 in the inner extremity of either feed-rack 87 or 80, so that its tip may be received by either opening 111 112 in the aforesaid rock-wheel. In Fig. 1 this arm is shown so that it has pinned together the distributing feed-rack 87 and the rock-wheel, though if the arbor were pulled outwardly against the force of the spring 114 and turned one hundred and eighty degrees the pin 109 would connect the rock-wheel and the supply feed-rack 80. Now evidently any movement of the aforesaid rock-wheel will be transmitted to one or the other feed-rack, according to which is connected therewith. To give such movement to the rock-wheel, I provide a lever 71, occupying a recess 74 in the upright 3 and pivoted at its lower end to the upright at 73. The upper end of this lever has teeth 77, meshing with the teeth 76 on the rock-wheel. Mounted horizontally on the upright 3 is a pin 68, which is attached to the lever 71 by a pin 72. The pin 68 is provided with a head 69, and surrounding the shank of the pin between said head and the upright 3 is a spring tending to hold the lever 71 at its left hand-position in Fig. 1.

It will be seen from what has been described that the pin 68, lever 71, rock-wheel, feed-racks, rider, and chasers provide mechanism for transferring the type from one drum to the other. The pushing of the pin 68, therefore, is adapted to accomplish the transfer in either direction. To provide a convenient arrangement for operating such transfer mechanism, I endow the supply-drum with a slight longitudinal movement. This drum is normally held at its extreme position away from the printing-drum by the spring 62. When, however, the supply-drum has been turned to bring the desired channel into alinement with the transfer mechanism, the supply-drum is bodily shoved toward the printing-drum. This movement accomplishes the double purpose of accurately positioning the supply-drum by the engagement of the pin 66 with one of the openings 65, as described, and of shoving the pin 68 to accomplish the transfer, the gap in advance of the supply-drum being taken up at the same time. When any type has been tranferred from either drum to the slot 60, it remains there until succeeding type, shoving it along, eventually complete the transfer to the opposite drum.

In order to hold the printing-drum in a fixed position in the manner described, the standard 3 is preferably provided with a second slot 116, in which is slidably mounted a small lock 117. The dimensions of this second slot are substantially the same as those of the slot 60, and the distance between the two slots is the same as that between any two adjacent channels, so that when the slot 60 is in register with one of the channels of the printing-drum the slot 116 will then be in register with the adjacent channel. Evidently this lock 117 may secure the drum against movement.

The arrangement of the different characters or type carried by the supply-drum will be that which is best adapted for facilitating the operation of setting them up upon the printing-drum. It is found in practice, however, that this arrangement is preferably not in alphabetic sequence, for it is desirable to place those characters which are used with most frequency so that they can be brought into alinement with the slot 60 without being obliged to turn the supply-drum through a great angle. For instance, channels with spaces or characters like the vowels "a" and "e" would be distributed with comparative frequency on the face of the supply-drum, while channels occupied by letters which are not used often, as the letters "x" and "z," would each have but one channel upon the drum. With such an arrangement the operation of alining the channel carrying any particular character with the slot 60 is much facilitated, and in order that the operator may be able to tell at a glance what channel or character is alining with the slot a rim 118 is provided at the outer edge of the supply-drum, which carries letters upon it corresponding to the channel opposite which they are located. As indicated in Fig. 1, this rim 118 has an annular portion 119, which closes all the outer ends of the channels of the drum.

From the foregoing description the operation of setting up the type upon the printing-drum and distributing them again into their proper channels upon the supply-drum should be clearly understood. However, it may be said that in setting up the type on the printing-drum the band or transfer-ribbon which passes over the printing-face of the drum is first removed. This is done by winding the entire band upon one of the spools, and for this purpose the extremity of the spindle may be squared, as indicated at 122, to engage with a key or crank. The printing-drum is then turned so as to bring that channel which is to carry the first line in alinement with the slot, and it is locked in this position in the manner described. The supply-drum is then manipulated so as to bring any desired letter or character which it carries into alinement with the opposite end of the slot, whereupon the automatic feeding mechanism having been properly connected the lateral sliding movement of the supply-drum effects an advance of one type into the slot. This operation continuing, the type being set up crowd each other back, the innermost member being in contact with the distributing-chaser. When a complete line has been set up in this way, the last type, which are then lying in the slot 60, are pushed through by the hand of the operator with a pencil or similar pointed article, and the entire row is moved over against the closed extremity of the channel. When a line has been set up in this manner, the keeper 126, which is shown in Fig. 9, is placed in the slot behind the last type of the line. At their bases these keepers are constructed similar to the bases of the type, so that they run in the channels and are retained therein. They are carried upon the supply-drum in the same manner as the regular type characters and type-spaces and are automatically fed from the supply-drum in the same manner. To cause the keepers to engage the channels with the desired tightness, they are provided with a bifurcated extremity 123, and the bifurcations are resilient and tend outwardly, so that they will retain the follower in the channels against movement by a slight force.

The length of the distributing-chaser is determined by the amount of margin desired at the left hand of the finished sheet. Where a greater margin is required for any particular line, this is obtained by utilizing the ordinary type-spaces, which are carried by the supply-drum.

The distance between the channels of the printing-drum is substantially the same as that between successive lines of type-written matter, where the lines are printed as closely as possible. In ordinary work, however, only the alternate channels are set up with type, the intermediate channels being ignored.

With the mechanism described it is possible to set up and reproduce in large quantities and at a rapid rate the body or principal portions of circular-letters or similar printed matter, after which the individual addresses required for each letter may be inserted by means of an ordinary type-writer having similar type characters to those used by the machine and a similar ribbon. In this manner a letter may be reproduced which has all the appearances of having been type-written, which is very desirable. This resemblance is heightened by the rolling impression this machine gives, as well as by the fact that each type is individually carried by the printing member, so that they need not be clamped in place with the rigidity of type locked in a form in the usual manner.

I claim—

1. The combination of a type-carrying member adapted to carry a page-form of individual assembled type said type being held loosely and individually on said type-carrying member, a coöperating platen forming with the type-carrying member a printing-couple whose surfaces roll one upon the other, and a ribbon adapted to pass between the type-carrying member and platen and receive an impression simultaneously from a multiplicity of type.

2. A rotatable member having a printing-surface adapted to print by rotary motion, and a transfer fabric mounted on and arranged to travel in unison with said surface, substantially as described.

3. A rotatable drum having along its surface longitudinal, parallel type-holders adapted to hold individual type in separate rows, and a transfer fabric carried by said drum and adapted to pass across the type thereon, whereby the rotation of the drum may cause the type to print, substantially as described.

4. The combination of a rotatable drum having type-holders along its surface, a font of type from which individuals are adapted to be assembled on said drum and held therein during rotation, and a transfer fabric arranged to travel with the type on said holders at the moment of printing, substantially as described.

5. A member adapted to turn on an axis and having a printing-surface adapted to print by such motion, a pair of spools mounted on said member, and a transfer fabric carried thereby, substantially as described.

6. A printing-drum adapted to carry a printing-surface on a portion of its periphery and having a recess between the ends of such portion, a pair of spools mounted within such recess, and a transfer fabric carried by said spools and adapted to extend around the drum or directly from spool to spool, substantially as described.

7. The combination of a member having a plurality of parallel type-holders each adapted to hold a row of individual type whereby a page-form of type may be carried by the member said type being held loosely and individually on said member, a coöperating platen forming with the type-carrying member, a printing-couple whose surfaces roll one upon the other, and a ribbon of a width sufficient to cover such page-form and adapted to pass between the type-carrying member and platen and receive an impression simultaneously from types in a straight line extending across such page-form.

8. The combination of a printing-couple, one member of which is adapted to turn upon an axis, a plurality of type-holders carried parallel with said axis by one member of the couple and each adapted to hold a line of type said type being held loosely and individually on said type-holders, and an inked fabric adapted to pass with paper between the members of the couple, said paper receiving a rolling impression through said inked fabric simultaneously from the line of type in a holder and successively from the lines in different holders.

9. In combination, a rotatable member, means for carrying type upon the surface thereof, a second member, means for concurrently moving said members so that their surfaces may coöperate, a web of transfer material adapted to pass between said members, and means for automatically feeding said transfer material in addition to its movement during printing, substantially as set forth.

10. In combination, a rotatable drum, means for carrying type upon the surface thereof, a member having a surface adapted to coöperate with said type, a band of transfer material carried by said drum, and automatic means for feeding said band, substantially as described.

11. In combination, a rotary member, means for holding individual type assembled in lines of words in separate rows upon the surface thereof, said type being held in such rows loosely and individually, a second member, means for rotating said first member and concurrently moving said second member so that the surfaces of the two members may coöperate, and a web of transfer material adapted to pass between said members and be impressed simultaneously by a multiplicity of type, substantially as described.

12. In combination, a rotatable drum having longitudinal parallel channels for holding a plurality of assembled individual type upon the face thereof, said type being held loosely and individually in said channels, a band of transfer material adapted to pass in contact with said type and move with it while printing and be impressed simultaneously by the rolling motion of each line of type in the respective channels, and means for feeding material to be printed to the action of said type, substantially as described.

13. In combination, a rotatable drum adapted to carry assembled individual type upon the face thereof, a band of transfer material mounted on said drum and adapted to cover the faces of said type, and means including a movable platen for feeding paper to such type, substantially as described.

14. In combination, a rotatable member, means carried thereby for holding individual type in rows on the surface thereof, a coöperating movable impression member, and a band of transfer material mounted on one of said members, substantially as described.

15. In combination, a rotatable drum, means for holding individual type in separated, parallel, longitudinal rows upon the surface thereof, a band of transfer material adapted to pass in contact with said type and moving with it while printing, means for feeding material to be printed to the action of said type, and means for feeding said band while the type is not printing, substantially as described.

16. In combination, a rotatable drum, means for holding assembled individual type in rows upon the surface thereof, a band of transfer material carried by said drum in contact with the face of said type, means for rotating said drum, means for automatically feeding said band as the drum rotates, and means for feeding material to be printed to the action of said type, substantially as described.

17. In combination, a rotatable drum, means for carrying individual type in longitudinal rows upon a portion of the surface thereof, a member having a surface adapted to coöperate with said type, a band of transfer material carried by said drum across the face of said type, means for rotating said drum, and means for feeding said band at a time when the type on said drum are out of coöperation with said member, substantially as described.

18. In combination, a rotatable drum adapted to print by rotary movement, means for retaining individual type upon the surface thereof, a coöperating member geared to said drum, a band of transfer material lying between said member and said drum and movable with them as they move to print, and means for automatically feeding said band during the non-printing portion of the rotation of the drum, substantially as described.

19. The combination of a type-carrying member adapted to carry a page-form of individual assembled type said type being held loosely and individually by said type-carrying member, a coöperating platen forming with the type-carrying member a printing-couple, one member of said couple being mounted to turn on a fixed axis and the other having concurrent movement, whereby the coöperating surfaces of said members may roll one upon the other, and an inked fabric adapted to pass between the members of the couple and receive an impression simultaneously from a multiplicity of type on the type-carrying member.

20. In combination, a rotatable drum, longitudinal channels along said drum for holding individual assembled type upon the face thereof, a second member, means for concurrently advancing such members so that their surfaces may bear upon each other as the drum rotates, a band of transfer material adapted to pass between said members, and automatic means for returning said second member to an extreme position, substantially as described.

21. In combination, a rotatable drum, means for retaining type upon the surface thereof, a second member, means for moving said members so that the surfaces thereof may bear upon each other, a band of transfer material lying between said surfaces, means for automatically feeding said band and means for normally constraining said second member to an extreme position, substantially as described.

22. In combination, a rotatable drum, means whereby said drum may carry type upon the face thereof, a member coöperating therewith, means for moving said members so that their surfaces may bear upon each other, a web of transfer material passing between the surfaces of said members, spools on said drum carrying the ends of said web, and automatic means for feeding said band between said spools, substantially as described.

23. In combination, two coöperating movable members, means for driving one of said members, means for transmitting movement between said members, one of said members comprising a rotary drum having longitudinal channels adapted to carry assembled individual type, and a web of transfer material passing between said members and mounted on said drum.

24. In combination, two coöperating movable members, means for driving one of said members, means for transmitting movement between said members, a transfer fabric passing between the said members and mounted on one of them and means for disconnecting the said members to arrest said transmitted movement, substantially as described.

25. In combination, two coöperating movable members, means for driving the first of said members, means for transmitting the driving force therethrough to the second of said members, means whereby one of said members may carry type on the face thereof, means for disengaging said members, a transfer fabric mounted on one of said members and adapted to pass between the surfaces of said members and automatic means for returning one of said members to an extreme position, substantially as described.

26. In combination, a rotatable drum, means for carrying type upon the face thereof, a movable flat carriage, means for concurrently moving said members so that the surface of said carriage may be impressed by the surface of said drum, means for returning said carriage to an extreme position, and a transfer material adapted to pass between said drum and said carriage and movable with one of them, substantially as described.

27. In combination, movable members, the surfaces whereof may coöperate, longitudinal channels in one of said members adapted to carry individual assembled type, said type being held loosely and individually in said channels, means for moving said members so that said surfaces may roll one upon the other, a web of transfer material adapted to pass between said surfaces and be impressed simultaneously by a multiplicity of type during such rolling motion and means for adjusting the relative position of said members whereby the degree of pressure between their surfaces may be regulated for different thicknesses of paper and for different amounts of ink carried by the transfer material, substantially as specified.

28. In combination, a rotatable drum, means for retaining type upon the surface thereof, a band of transfer material mounted on said drum and passing over said type, an elastic platen, means for moving such members so that the surface of said drum may roll upon said platen, and means for adjusting the position of the platen with respect to said drum, substantially as described.

29. In combination, a rotatable drum adapted to carry assembled individual type upon the face thereof, a band of transfer material adapted to cover the face of said type and mounted on said drum, an elastic platen, and means for simultaneously moving said drum and said platen to impress material between them, substantially as described.

30. In combination, a member adapted to turn on an axis and having on its surface carriers for individual type assembled into words, a transfer material adapted to cover the faces of said type while printing, means including a movable platen for feeding paper to such type, and means for moving the transfer material while the type is not printing to present a fresh face for the next impression.

31. In combination, a rotatable drum, means for retaining type upon the surface thereof, a band of transfer material passing over said type, a carriage having an elastic platen, means for moving said members so that the surface of said drum may roll upon said platen, means for guiding said carriage and means for adjusting the position thereof with respect to said drum, substantially as described.

32. In combination, a rotatable drum adapted to carry type upon the face thereof, a band of transfer material adapted to cover the face of said type, a carriage having an elastic platen, means for simultaneously moving said drum and said carriage so that said elastic platen may be impressed by the type upon said drum, a spring normally constraining said carriage to an extreme position and means for adjusting the plane in which said carriage moves, substantially as described.

33. In combination, a rotatable drum adapted to carry type upon the face thereof, a transfer material adapted to cover the faces of said type, a movable carriage, means for driving said rotatable drum, means whereby said carriage may engage with said rotatable drum whereby the former is advanced, means for disengaging the connection between said drum and said carriage, and means for automatically returning said carriage to an extreme position, substantially as described.

34. In combination, a rotatable drum adapted to carry type upon the face thereof, a transfer material adapted to cover the face of said type, a movable carriage adapted to pass adjacent to said drum, means for advancing said carriage so that the surface of said drum may roll upon said carriage, automatic means for returning said carriage to an extreme position, and a dash-pot to cushion the return of the same, substantially as described.

35. A pair of members, each provided with a plurality of longitudinal type-holders, type transferable from holder to holder, one of said members being adapted to turn about an axis, and an impression device coöperating with assembled type on said last-mentioned member during its movement, whereby said type may be assembled, printed from and distributed while in the machine, substantially as described.

36. A pair of members, each provided with a plurality of longitudinal type-holders, type transferable from holder to holder, mechanism for effecting such transfer, one of said members being adapted to turn about an axis, an impression device coöperating with assembled type on said last-mentioned member during its movement, whereby said type may be assembled, printed from and distributed while in the machine, substantially as described.

37. In a duplicating-machine, the combination of a pair of rotary members each provided with a plurality of longitudinal type-holders, type held by said holders and transferable thereamong, an impression device coöperating with the assembled type on one of said members while it is rotating, whereby said type may be assembled, printed from and distributed while in the machine, substantially as described.

38. In combination, a member, means for carrying type upon the face thereof, a second member coöperating therewith, one of said members having rotary motion to cause printing, a transfer material adapted to pass between said members and automatic means for feeding the type into an assembled line upon the face of said first member, substantially as described.

39. In combination, a member adapted to carry movable individual type upon the face thereof, a second member similarly adapted to carry type, means for moving said members so that said type may be in position to be fed from one to the other, automatic means for feeding said type a character at a time between said members to assemble or distribute such type, a third member having a surface coöperating with said first member, and a transfer material adapted to pass therebetween, substantially as described.

40. In combination, a rotatable printing-drum adapted to print by rotary movement, a rotatable supply-drum, movable type carried by said drums, mechanism for assembling said type on the printing-drum, a platen adapted to coöperate with said printing-drum, and a transfer material lying between said printing-drum and said platen, substantially as described.

41. In combination, a printing-drum, a rotatable supply-drum, movable type carried by said drums, means for feeding said type between said drums to assemble it on the printing-drum or to distribute it on the supply-drum, an impression-platen coöperating with said printing-drum during the latter's rotation, a transfer material passing between said printing-drum and said platen and means for moving the transfer material at a time when it is not printing, substantially as described.

42. In combination, a rotatable printing-drum, a rotatable supply-drum, movable individual type carried by the faces of said drums, means for alining the type of one with the type of the other, means for feeding said type between said drums to assemble them into words on the printing-drum or distribute them on the supply-drum, a member coöperating with said printing-drum, the surface whereof is adapted to be borne against by the type on said printing-drum, and a transfer material adapted to pass between said member and said drum, substantially as described.

43. In combination, a printing-drum, a rotatable supply-drum, movable type carried by said drums, means for feeding said type between said drums, a carriage coöperating with said printing-drum and adapted to receive blank sheets, and a transfer material passing between said printing-drum and said carriage, substantially as described.

44. In combination, a rotatable printing-drum, a rotatable supply-drum, movable type carried by the faces of said drums, means for alining the type of one with the type of the other, said supply-drum having a limited lateral movement, means operated by said movement for feeding said type between said drums, a member coöperating with said printing-drum, the surface whereof is adapted to be impressed by the surface of said printing-drum and a transfer material adapted to pass between said member and said drum, substantially as described.

45. The combination of a pair of drums placed end to end, means on the surface of each drum for holding longitudinal rows of type, and type slidably carried by said holders and transferable from drum to drum, whereby selected type may be assembled in lines on either drum, substantially as described.

46. The combination of a pair of drums, means whereby said drums may carry longitudinal rows of type, and mechanism for transferring type from one drum to the other, whereby lines of selected type may be assembled on either drum without removal from the machine, substantially as described.

47. In combination, a supply member, a printing member, each adapted to carry individual type, means for moving such type from one member to the other, and a band of transfer material carried by the printing member and adapted to lie in contact with the face of the type thereon or to be removed therefrom to allow the type to be moved from one member to the other, substantially as described.

48. In combination, a rotatable printing-drum adapted to carry individual type on its face, a supply member coöperating therewith, means for feeding type from the supply member to the printing-drum, and an inked ribbon carried by the printing-drum on spools and adapted to lie in contact with the type, or to be free therefrom to allow the type matter to be composed, substantially as described.

49. In combination, a rotatable supply-drum, a rotatable printing-drum, means whereby said drums may carry rows of type, and means for transferring type from one drum to the other, substantially as described.

50. In combination, a rotatable supply-drum, a rotatable printing-drum, means carried by said drums for holding rows of type, which may aline, and means for transferring type from either drum to the other, substantially as described.

51. In combination, a rotatable printing member having on its surface means for carrying longitudinal rows of assembled individual type, a movable supply member adjacent thereto, and hand-operated means for feeding type from one member to the other, substantially as described.

52. In combination, a rotatable printing-drum, a rotatable supply-drum, said drums being mounted with ends adjacent to each other, movable individual type carried by said drums, and means for transferring type individually from either drum to the other, substantially as described.

53. In combination, a rotatable printing-drum, a rotatable supply-drum placed end to end, each drum having on its surface means for carrying individual type in longitudinal rows, said drums being so placed that a row in one drum may aline with a row in the other, and means for transferring type from one of such rows to the other, substantially as described.

54. A combination, a pair of drums placed end to end, each drum having on its surface means for carrying longitudinal rows of individual type, and mechanism for transferring type from the end of either drum to the adjacent end of the other, substantially as described.

55. A combination, a pair of drums placed end to end, each drum having on its surface means for carrying longitudinal rows of individual type, and mechanism for transferring type from the end of either drum to the adjacent end of the other, and means in addition to the drum for supporting the type during the transfer, substantially as described.

56. In combination, a rotatable drum, means carried thereby for retaining type in rows, a rotatable supply-drum axially alined therewith, and means for transferring type from one drum to the other, substantially as described.

57. A combination, a pair of axially-alined drums, each having on its surface longitudinal means for carrying rows of individual type, means for bringing any row on either drum to aline with any row on the other, means for transferring type from one of such alined rows to the other, substantially as described.

58. In combination, a rotatable printing-drum and a rotatable supply-drum placed end to end on horizontal alined axes and having a vertical frame member between them, means for feeding type from one drum toward the other across the frame member, and means carried by the frame member for supporting the type in transit, substantially as described.

59. In combination, a printing-drum, a supply-drum, means carried thereby for retaining type, individual type adapted to be held on the printing-drum assembled in words, feeding mechanism for said type, and means for actuating said feeding mechanism, substantially as described.

60. The combination of a printing-drum, a supply-drum, a font of type, and mechanism for feeding the type one at a time from one drum to the other, substantially as described.

61. The combination of a printing member, a supply member, a font of type, the various individuals of which are all of the same width lengthwise of the line, means for feeding the type one at a time from one member to the other by movements individually equal to the width of a type, and a platen having a rolling contact with type on the printing member, substantially as described.

62. A pair of drums placed end to end and adapted to carry rows of individual type, combined with said type in a font the individuals of which are of the same width lengthwise of the line, and mechanism for feeding the type from one drum to the other by movements individually equal to the width of a type, substantially as described.

63. In combination a rotatable printing-drum, a rotatable supply-drum, axially alined therewith, movable type carried by said drums and automatic means for feeding said type, substantially as described.

64. In combination, a rotatable drum, means for retaining type upon the face thereof, a supply-drum axially alining therewith and having substantially similar means adapted to retain a supply of type, and means for advancing said type, substantially as described.

65. In combination, a rotatable printing-drum, a rotatable supply-drum mounted opposite the end of said printing-drum, said drums each having mechanism for carrying rows of type, and means for bringing such mechanisms into alinement, and means for locking them in such alinement, substantially as described.

66. In combination, a rotatable supply-drum, a rotatable printing-drum, means carried by said drums for holding rows of type, which may aline, one of said drums having a limited longitudinal movement, and means whereby said longitudinal movement may aline said rows of type, substantially as described.

67. In combination, a rotatable supply-drum, a rotatable printing-drum, means whereby said drums may carry rows of type, one of said drums having a limited lateral movement, and means whereby said lateral movement may advance said type, substantially as described.

68. The combination of a movable printing member having a plurality of type-holders, a type-storage member having a plurality of type-holders, a font of individual type forming a permanent part of the machine and transferable from the holders of the storage member to those of the printing member and vice versa without removal from the machine, and an impression-platen having a rolling contact with the type of the printing member while the latter is moving.

69. In combination, a rotatable drum, a supply-drum, means carried thereby for retaining type, movable type, feeding mechanism for said type, said supply-drum having a limited lateral movement, means actuated thereby for alining said drums and actuating said feeding mechanism, substantially as described.

70. In combination, a rotatable drum, means for retaining type upon the face thereof, a supply-drum axially alining therewith and having substantially similar means adapted to retain a supply of type, said supply-drum having a limited longitudinal movement, and means actuated by said longitudinal movement for advancing said type, substantially as described.

71. In combination, a rotatable printing-drum, a rotatable supply-drum mounted axially with respect to said printing-drum and having a longitudinal movement, said drums having corresponding rows of type and means whereby said longitudinal movement may bring the said rows of type into alinement, means actuated thereby for advancing the type of said rows, and a platen coöperating with said printing member, substantially as described.

72. In combination, a rotatable printing-drum having means for carrying longitudinal rows of individual type on its surface, an adjacent supply-drum having longitudinal rows of type, each row comprising the same letter or character, and means for indicating the characters in the various rows of the supply-drum, substantially as described.

73. In combination, a rotatable printing-drum having means on its surface for carrying longitudinal rows of individual type, an adjacent rotatable supply-drum having means on its surface for carrying type in rows, mechanism for transferring type from a row of the supply-drum to a row of the printing-drum, and means for indicating the character in that row of the supply-drum which is at the transfer position, substantially as described.

74. In combination, a rotatable printing-drum, a rotatable supply-drum, said drums having means for carrying type upon their faces, means for indicating substantial alinement of the type rows of said drums, and means for insuring accurate alinement of said rows, substantially as described.

75. In combination a rotatable printing-drum, means for locking the same against movement, a rotatable supply-drum, said drums having means for carrying type upon their faces, means for indicating substantial alinement of the type rows of said drums, said supply-drum being capable of a lateral movement and means whereby said movement may effect an accurate alinement of said channels, substantially as described.

76. In combination, a rotatable printing-drum, means for holding the same against rotation, a rotatable supply-drum, said drums being adapted to carry type in rows, and feeding mechanism adapted to advance the type from one drum to the other, substantially as described.

77. In combination, a rotatable printing-drum, means for locking the same against rotation, a rotatable supply-drum said drums being adapted to carry type in rows, means for indicating substantial alinement of the type rows of said drums, said supply-drum being capable of a limited lateral movement, means whereby said lateral movement may effect a complete alinement of said type rows, and feeding mechanism adapted to move up the type and actuated by the said lateral movement of said supply-drum, substantially as described.

78. In combination, a rotatable printing-drum, a rotatable supply-drum, said drums having type-holding means, which may aline, longitudinally-extending members lying above said means and adapted to feed the type, and mechanism for actuating the same, substantially as described.

79. In combination, a rotatable printing-drum, a rotatable supply-drum, said drums having channels which may aline, said supply-drum having a limited movement along its axis, means for normally maintaining said drum in an extreme position, longitudinally-extending members lying above said channels and adapted to feed the type, and means whereby the longitudinal movement of said supply-drum may actuate the same, substantially as described.

80. In combination, a rotatable supply-drum, a rotatable printing-drum, type carried thereby, feeding mechanism adapted to advance said type, said feeding mechanism including a lever between the drums, and means for actuating said lever, substantially as described.

81. In combination, a supply member, a printing member, means whereby said members may carry type, said supply member having a limited lateral movement, means whereby said lateral movement may advance said type, and a platen having a rolling contact with type on the printing member, substantially as described.

82. In combination, a rotatable supply-drum, a rotatable printing-drum, type carried thereby, feeding mechanism adapted to advance said type, said feeding mechanism including a lever, said supply-drum having a limited lateral movement and means whereby said lateral movement may actuate said lever, substantially as described.

83. In combination, a rotatable supply-drum, a rotatable printing-drum, type carried thereby, feeding mechanism, a lever adapted to actuate the same, said supply-drum having a limited lateral movement, means whereby said lateral movement of said supply-drum may actuate said lever, and a spring normally constraining said supply-drum toward an extreme position, substantially as described.

84. In combination, a printing-drum, a supply-drum, means for carrying type upon the faces of said drums, a rocking member, feed-racks extending over said drums, movable type carried by said drums, means which may connect said racks with said rocking member, and means for rocking such member, substantially as described.

85. In combination, a rotatable printing-drum, a rotatable supply-drum, type carried in rows upon said drums, feed-racks extending over alining type rows of said drums, and means for actuating said feed-racks, substantially as described.

86. In combination a rotatable printing-drum, a rotatable supply-drum, type carried in rows upon said drums, feed-racks extending over the alining type-rows of said drums, a rock-wheel, means for connecting said racks therewith and means for actuating said feed-racks by a movement of said supply-drum, substantially as described.

87. In combination, a rotatable printing-drum, a rotatable supply-drum, feed-racks extending adjacent to the surface of said drums and longitudinally thereof, said drums having type rows, means for bringing said type rows into alinement substantially beneath said feed-racks, a movable member adapted to be connected with either of said feed-racks, and automatic means for actuating said movable member, substantially as described.

88. In combination, a pair of independently-movable members, each adapted to carry type in rows, feed-racks supported thereabove, said feed-racks having a limited movement, means for constraining said feed-racks to an extreme position, means whereby said feed-racks may advance the type in said type rows, and automatic means for actuating said feed-racks, substantially as described.

89. In combination, a rotatable printing-drum, a rotatable supply-drum, feed-racks supported thereabove, type carried in longitudinal rows upon said drums, means for bringing said type rows into alinement substantially beneath said feed-racks, said feed-racks having a limited movement, means for constraining said feed-racks to an extreme position, means whereby said feed-racks may advance the type in said type rows and automatic means for actuating said feed-racks, substantially as described.

90. In combination a member adapted to carry type in rows, a rack extending longitudinally of such rows, chasers behind said type adapted to be engaged by said rack, and means for moving said rack transversely of said member and toward a chaser to engage said chaser and for moving said rack parallel with said member to feed the engaged chaser and the type in advance thereof, substantially as set forth.

91. In combination a member adapted to have type set up thereupon, a member adapted to carry a supply of type, said type being carried in rows, means for bringing the type rows of said members into alinement, racks extending over said alining rows, chasers behind said type adapted to engage said racks, automatic means for actuating said racks, and means for adjusting the movement thereof, substantially as set forth.

92. In combination, a supply member, a printing member, rows of type carried by said members, which rows may aline, a fixed feed-bar extending substantially above said alining rows, feed-racks carried by said feed-bar and extending respectively over the alining rows of said members, and mechanism adapted to actuate said feed-racks, substantially as described.

93. In combination a rotatable supply-drum, a rotatable printing-drum, rows of type carried by said drums, which rows may aline, a fixed feed-bar extending substantially above said alining rows, feed-racks carried by said feed-bar and extending respectively over the alining rows of said drums, a movable member, and means for connecting the same so as to actuate either of said feed-racks, substantially as described.

94. In combination, a rotatable printing-drum, a rotatable supply-drum, members extending longitudinally of said drums and adjacent to the surfaces thereof, type carried in rows on said drums, means for locking said drums so that rows thereof may aline substantially beneath said members, said members having a limited longitudinal movement, means whereby said movement may effect an advance of said type, a rocking member, and operative connections between the same and said longitudinally-extending members, substantially as described.

95. In combination, a rotatable printing-drum, a rotatable supply-drum, means for mounting type in rows upon said drums, chasers carried behind said type in each drum, means for alining said rows of type, and feeding mechanism adapted to advance said chasers, substantially as described.

96. In a combination, a rotatable printing-drum, a rotatable supply-drum, type carried by said drums in rows, chasers carried behind said type, feeding mechanism adapted to advance said chasers, and means for supporting the type intermediately of the two drums, substantially as described.

97. In combination, a rotatable supply-drum, means for carrying type thereon in rows, a member having substantially similar means adapted to receive set-up type, means between said member and said supply-drum and adapted to support the type in transit, means for alining the type rows of said member and said supply-drum, and means for transferring type from the supply-drum to said member and vice versa, substantially as described.

98. In combination, a rotatable printing-drum, a rotatable supply-drum, type carried by said drums, in rows, chasers carried behind said type, feeding mechanism adapted to advance said chasers, and means whereby a lateral movement of said supply-drum may advance said feeding mechanism, substantially as described.

99. In combination, a rotatable supply-drum, means for carrying type thereon in rows, a member having substantially similar means adapted to receive set-up type, a second member between said first member and said supply-drum and normally adapted to prevent removal of type from said supply-drum, means for alining the type rows of said first member with the type rows of said supply-drum, said second member having an opening through which said type may pass, substantially as described.

100. In combination, a supply-drum, a printing-drum, said drums being rotatable and having means adapted to retain type, a disk lying between said drums and adapted to prevent removal of said type, means for locking said disk against rotation, said disk having an opening therethrough, and means for alining the channels of said drums, substantially as described.

101. In combination, a rotatable supply-drum, a rotatable printing-drum, a disk abutting the inner face of said supply-drum, said disk having a recess in an edge thereof, said drums having channels which may aline therewith, the edge of said disk being adapted to close the inner ends of the channels of said supply-drum, substantially as described.

102. In combination, a supply-drum, a printing-drum, a disk abutting the inner face of said supply-drum, means for locking said disk against rotation, said disk having a notch in an edge thereof through which type may pass, said drums having channels adapted to carry type and which may aline with said notch, and a spring constraining said disk against the face of said supply-drum, substantially as set forth.

103. The combination of a printing member adapted to turn about an axis and having a plurality of type-carrying channels, a movable supply member also having a plurality of type-carrying channels, means for transferring type from one member to the other, mechanism for locking the supply member in position preceding the transfer, and an impression-platen coöperating with the printing member during the movement of the printing member.

104. In combination with a rotatable supply-drum, a printing-drum, said drums having means adapted to carry type, means for transferring type from one drum to the other, and means for locking the supply-drum in definite position preceding such transfer, substantially as described.

105. In combination, a rotatable supply-drum, a printing-drum, said drums having means adapted to carry type, one of said drums having a series of recesses, a member with a tapered point adapted to engage any of said recesses to lock such drum in definite position, means for transferring type from one drum to the other, and means for causing such locking preceding the transfer, substantially as described.

106. In combination, a rotatable supply-drum, a printing-drum, said drums having means adapted to carry type, means for holding said printing-drum in definite position, said supply-drum having a series of recesses, and a member having a tapered point adapted to engage any of said recesses, substantially as described.

107. In combination, a rotatable supply-drum, a printing-drum, said drums having channels adapted to carry type, means for locking said printing-drums in fixed positions, means for indicating substantial alinement of channels of said drums, said supply-drum having a series of openings and a fixed member having a tapered point adapted to engage said openings, said supply-drum having a limited lateral movement which may effect said engagement, substantially as described.

108. In combination, a rotatable printing-drum, a rotatable supply-drum, an intermediate member having a slot, said drums having type-carrying means adapted to aline with said slot, there being means for supporting type in said slot and out of engagement with the two drums, substantially as described.

109. In combination, a rotatable printing-drum, a rotatable supply-drum, and a fixed member having a slot therethrough, said drums having channels which may aline with said slot, there being means for supporting the type in said slot and out of engagement with the two drums, substantially as described.

110. In combination, a rotatable printing-drum, a rotatable supply-drum, a fixed member therebetween, said fixed member having a slot therethrough adapted to pass type, and a lock mounted in said fixed member, said drums having longitudinal channels, said lock being adapted to engage with the channels of said printing-drum, substantially as described.

111. In combination, a rotatable printing-drum, type carried upon the face thereof, a band of transfer material carried by said drum and adapted to cover the faces of said type, a carriage coöperating with said drum and adapted to be impressed by said type, a vacuum-cup, and means for automatically depressing the same upon said sheet after it has passed beneath said drum, substantially as described.

112. In combination, a rotatable printing-drum, type carried upon the face thereof, a band of transfer material carried by said drum and covering the faces of said type, a carriage coöperating with said drum and adapted to be impressed by said type, means for indicating the position of the blank sheet upon said carriage, a vacuum-cup and means carried by said carriage for automatically depressing the same upon said sheet after it has passed beneath said drum, substantially as described.

113. A rotatable member having means on its surface for carrying individual assembled type in rows, said member being adapted to print by rotary motion, and a transfer fabric which is arranged to travel in company with said surface during the printing.

114. The combination of a rotatable member having type-holders, a font of type from which individuals are adapted to be assembled on said member and held thereon during rotation, a second member, means for concurrently moving said members so that their surfaces may coöperate, a web of transfer material adapted to pass between said members and traveling in the same general direction as the type during printing, and means for automatically feeding said web with reference to the type.

115. The combination with the two members of a printing-couple, one of said members having rotary motion by which it prints, of a supply member, a font of individual type adapted to be stored thereon, mechanism for transferring selected type and assembling them into words on the member of the printing-couple which has rotary motion, means for supplying ink to said type, whereby it may be assembled, printed from, and distributed while in the machine.

116. The combination with the two members of a printing-couple, one of said members having rotary motion during printing, of a supply member, a font of individual type adapted to be stored thereon, mechanism for transferring selected type and assembling them into words on one member of the printing-couple, a transfer fabric, and means for holding the same between the members of the printing-couple at the time of printing, said means allowing the unobstructed assemblage of type when the couple is not printing.

117. The combination of a rotatable drum adapted to carry type in longitudinal rows on its surface and print by rotary motion, an impression-platen coöperating therewith, a ribbon of transfer fabric of substantially the full effective width of the drum, extending between the drum and platen, and a pair of spools carrying the ends of said ribbon and journaled on axes parallel with the axis of rotation of the drum whereby the ribbon may move with the type at the moment of printing.

118. In combination, a platen and a coöperating printing member having means for carrying longitudinal rows of individual type, a type-supply, mechanism for transferring type from the supply to the printing member, and means for indicating the character of the type in position to be transferred.

119. The combination of a rotatable printing-drum having means for carrying longitudinal rows of individual type, supply mechanism adapted to carry rows of type, each row comprising the same letter or character, mechanism for transferring type from the supply to the printing-drum, and means for indicating the character in that row of the supply mechanism with which the transfer mechanism is coöperating.

120. In a combined setting, distributing and printing machine, the combination of a font of individual type each forming a permanent part of the machine, a supply mechanism, a printing mechanism comprising a pair of coöperating members one of which is adapted to turn on an axis during printing, the supply mechanism and one part of the printing mechanism each having rails with overhanging edges providing a plurality of channels adapted to confine such type, and means for transferring type from either of said mechanisms to the other.

121. The combination, in a unitary machine, of a font of individual type forming a permanent part of the machine, a printing-couple and means forming a permanent part of the machine for assembling characters thereof into parallel lines of desired words and printing therefrom by rolling impression of the couple and distributing such characters without removal from the machine.

122. The combination, in a unitary machine, of a pair of members each provided with a plurality of type-holders, a font of individual type on said holders, mechanism for transferring the type from a holder on one member to a holder on the other to assemble the type into words or distribute it, one of said members being adapted to turn about an axis and an impression device adapted to coöperate with assembled type on said last-mentioned member while the same is moving whereby said type may be assembled into words, printed from and distributed while remaining in the machine.

123. The combination, of a pair of members each provided with a plurality of type-holders, one of said members being a rotary drum, an impression-platen coöperating with said drum during its rotation, and a font of individual type held on said holders and transferable thereamong, whereby the type may be assembled, printed from and distributed while in the machine.

124. The combination, of a supply member and a printing member, each having a plurality of type-holders and each independently movable, type on said holders, mechanism for transferring type from a holder on one member to a holder on the other while the members are not moving, and an impression device adapted to coöperate with assembled type on the printing member, whereby said type may be assembled, printed from and distributed while in the machine.

125. The combination, of a movable supply member, an independently-rotatable printing-drum, mechanism for transferring individual type from said member to said drum and vice versa, an impression-platen coöperating with type on the cylindrical surface of said drum as it rotates, and means for inking the type on the drum.

126. The combination of a member adapted to carry a plurality of lines of type said type being held loosely and individually by said member, a coöperating platen forming therewith a printing-couple one member of which is adapted to turn on an axis, an inked fabric adapted to contact with paper between the members of the couple, whereby the paper is impressed by rolling motion simultaneously by a multiplicity of type acting through said fabric, and means for moving said fabric in the direction of its length when not printing to cause it to present a fresh face to the type.

127. The combination of a printing member, a font of individual type forming a permanent part of the machine, a storage member having respective repositories for different characters in the font, and mechanism forming a permanent part of the machine for feeding the type one at a time from either member to the other to assemble them into words on the printing member or to distribute them into repositories in the storage member.

128. In a duplicating-machine, the combination of two members, one of them being a drum and the other flat, one adapted to hold parallel rows of type and the other to act as a platen therefor, an impression fabric adapted to extend across the face of the several lines of type carried by such type-holder, a type-supply mechanism, and mechanism for transferring type therefrom to or from the type-holding member.

129. The combination of a type-holding member adapted to turn on an axis and having on its surface parallel open-ended grooves into which type may be shoved, a coöperating member having corresponding open-ended grooves for the type, and a font of type forming a permanent part of the machine and arranged to occupy said grooves and be transferable between them from either member to the other, and means coöperating with the member first mentioned while it is turning on its axis to print from the type on such member.

130. In a duplicating-machine, the combination of a member having a curved surface formed to carry rows of type, a font of individual type formed to be held on such surface, means for moving such surface about its center of curvature, a platen coöperating with such surface and arranged to be moved when such surface moves, whereby printing may be caused by the movement of such surface, and mechanism for assembling the type into desired words on such surface.

131. The combination of a movable printing member having a plurality of parallel type-holders, a supply member, a font of individual type forming a permanent part of the machine, mechanism for feeding the type from the supply to such holders to assemble parallel lines thereon, and an impression-platen coöperating with the printing member while the same is moving.

132. The combination of a printing member having a plurality of parallel type-holders, a supply member, a font of individual type forming a permanent part of the machine, and mechanism for feeding the type from the supply to such holders to assemble parallel lines thereon, mechanism for printing from such parallel lines by continuous movement, and mechanism for distributing the type back to the supply.

133. The combination of a printing member having a plurality of parallel type-holders, a supply member, a font of individual type forming a permanent part of the machine, and transferable from the supply to said holders, and mechanism for printing such plurality of lines by continuous movement.

134. The combination of supply mechanism, printing mechanism, means forming a permanent part of the machine for feeding type from either of said mechanisms to the other with its face end upward, and means for printing from said type while in the printing mechanism with its face end downward.

135. The combination of supply mechanism, a printing member adapted to turn about an axis and having along its surface a series of longitudinal rails with overhanging edges, type-grooved for the reception of said edges and transferable from said mechanism to said member whereby a page of type may be assembled on said member, and an impression-platen below said member with which the type may coöperate while said member is turning the type being held to said member by said grooves and rails.

136. In a duplicating-machine, a rotary drum having on its surface a series of longitudinal rails with overhanging edges, combined with type grooved on its sides to receive said edges, said rails being adapted to carry a plurality of parallel lines of type, said type occupying the channels between the rails and extending above their grooves onto the outer surface of the rails, and an impression-platen coöperating with assembled type on the drum while the same is rotating.

137. A rotary member having on its surface carriers for individual type assembled into lines of words parallel with the axis of rotation said type being held loosely and individually on said rotary member, a platen with which said member may coöperate while rotating, whereby said rotary member may present simultaneously a line of words to the platen and at the same time impress the platen with such line, a printing fabric passing between the member and platen, and means for shifting the fabric while all the lines of words are out of coöperation with the platen.

138. A type-carrying member which prints by turning on an axis, and an inking-ribbon mounted on such member.

139. A type-carrying member adapted to print by rotary movement, an inking-ribbon therefor, and means for shifting the ribbon while the member is not printing.

140. A rotary drum having on its surface a plurality of parallel longitudinal channels adapted to carry individual type assembled into lines of words, a platen with which said drum may coöperate while printing by rotary motion, said drum presenting simultaneously a line of words to the platen and the platen being adapted to hold a sheet of paper in coöperation therewith, a printing fabric passing between the drum and such paper, and mechanism for regulating the time of presentation of the paper.

141. A rotary member having on its surface carriers for individual type assembled into words, a platen with which said member may coöperate while printing, and a printing fabric mounted on the rotary member and passing between it and the platen.

142. A member having on its surface carriers for individual type assembled into words, a platen with which said member may coöperate while printing by rolling motion, a printing fabric passing between the member and platen and moving with them at the time of printing, and means for changing the position of said ribbon while the member is not printing.

143. A type-carrying member which prints by movement, an inking-ribbon mounted on such member, and means for giving said ribbon a movement other than its movement with the member while printing.

144. A member adapted to turn on an axis and having on its surface carriers for individual type assembled into words, a platen with which said member may coöperate while printing by such motion of said member, an inking-ribbon mounted on such member and moving with it and the platen during printing, and means for shifting said ribbon across the type on the rotary member while the same is not printing.

145. A member adapted to turn on an axis while printing and having a type-carrying surface carried about by such axis, a coöperating impression-platen having a rolling contact with such surface, and an inked fabric passing between said member and platen and having one end at least mounted on said member.

146. A rotary member having on its surface carriers for individual type assembled into words, a platen with which said member may coöperate while rotating, a printing fabric passing between the member and platen, and movable mechanism for regulating the starting-point of the paper to be fed between the printing fabric and the impression-platen.

147. The combination of a printing-couple, one member of which is rotary, means on one member of the couple for carrying individual assembled type in parallel lines, a printing fabric adapted to pass between the members of the couple, and mechanism mounted in part upon one of the members of the couple to determine the starting-point of the paper to be fed thereto.

148. In a duplicating-machine, the combination of a drum, means for holding individual type in lines upon its face, a member movable in coöperation therewith and suitable to receive the impression of the type, a web of transfer material running between the two aforesaid members and traveling with them during the time of impression and having a movement transversely of the aforesaid lines of type during the portion of the cycle where impression is not taking place, and means contained in part upon one of above members to determine the starting-point of the paper to be fed between the web of transfer material and the impression member.

149. In a duplicating-machine, the combination of a type-holding drum, an adjustable impression-receiving member, a web of transfer material running between the two members at substantially their peripheral speed during impression, automatic means for moving the web of transfer material transversely of the lines of type on the type-holding drum, and adjustable means for predetermining the starting-point of the paper to be fed between the web of transfer material and the impression-receiving member.

150. In a duplicating-machine, the combination of a rotary drum, channels therein for holding individual assembled type in parallel lines, a platen movable in coöperation therewith while the drum rotates, a web of transfer material traveling between the drum and platen in the common direction of their coöperating surfaces while printing, means for giving said web another movement between successive impressing operations, means for guiding the paper, and adjustable means for regulating the time of feeding the paper.

151. The combination of a rotary printing-drum having a plurality of parallel grooves, each groove having permanent walls between which individual type are seated, means extending parallel with the groove for engaging in common the type in that groove and holding them, a platen coöperating with said drum, and an inking-ribbon adapted to pass between the drum and platen.

152. The combination, in a unitary machine, of storage mechanism, printing mechanism, mechanism for feeding type from the storage mechanism into the printing mechanism face end upward, a platen coöperating with the type when face end downward in the printing mechanism, and an inking-ribbon carried by the printing member and being adapted to be passed across the face of the type thereon and travel with such type when impressing the platen.

153. A drum having along its surface longitudinal parallel grooves, means for holding individual type assembled into words in said grooves against radial displacement, resilient means of less height than the type, said means removably occupying the grooves at intermediate points in the length thereof for preventing longitudinal displacement of the type, a platen coöperating with the drum, and an inking-ribbon adapted to pass between said platen on one side and said type and resilient means on the other.

154. The combination with a printing-couple one member of which is adapted to turn on an axis of assembling mechanism, distributing mechanism, and an actuating mechanism movable in one direction to assemble and in the other to distribute.

155. In a type assembling and distributing and printing machine, the combination of a printing-couple one member of which is rotary a supply member, hand-actuated means for distributing type into it from the printing-couple, and hand-actuated means for assembling type from it onto the printing-couple.

156. The combination in a unitary structure of a printing-couple one member of which is adapted to turn on an axis; mechanism for assembling type on such member, mechanism for distributing type from such member, and hand-actuated means for operating either mechanism.

157. The combination in a unitary machine of a storage member, a movable printing member, each having a plurality of channels, type transferable between such channels, and an impression-platen coöperating with assempled type on the printing member while it is moving.

158. A storage member provided with a plurality of holders for carrying individual type arranged in the different holders according to the different characters, a printing-couple consisting of a printing member and an impression device, one of which is rotary, said printing member being provided with a plurality of type-holders parallel with each other, a font of individual type having the usual letters, figures and characters and transferable from holder to holder, and said impression device coöperating with assembled type on the printing member, whereby said type may be assembled, printed from, and distributed while in the machine.

159. The combination with a platen and a printing member, one of which is rotary, said printing member having a plurality of type-holders, of a storage member having a plurality of type-holders, a type-guide adapted to lead from one member to the other, and type adapted to be transferred along such guide.

160. A printing member having a plurality of type-holders, a storage member having a plurality of type-holders, a transfer-guide between the two, each member being adapted to have its presentation to said guide changed, and type formed to be held in the machine and adapted to be transferred along said guide without removal from the machine.

161. The combination of a pair of adjacent members, each having a plurality of type-holders and means for relatively moving said members to bring any holder of one member into alinement with any holder of the other, type transferable between alined holders, and means whereby one of said members may print by rolling contact.

162. A pair of drums placed end to end, each having a plurality of type-holding channels, and means for bringing any channel of either drum into coöperation with any channel of the other drum.

163. A pair of drums placed end to end, each having a plurality of type-holding channels, a guide for type passing between the drums, and means for selecting the channels of the respective drums with which said type-guide coöperates.

164. The combination of a printing member having a plurality of type-holders, a storage member having a plurality of type-holders, a type-guide for the transference of type from one member to the other, and means for selecting the particular holders of the two members with which such guide may coöperate.

165. The combination of a pair of members, each having a plurality of open-ended type-holding channels, and a transfer channel between the members adapted to coöperate with the open ends of channels in the two members, with provisions for relative movement between each member and said transfer-channel, enabling each channel of one member to coöperate with any channel of the other member through the transfer-channel.

166. The combination of a pair of movable members each having a plurality of type-holding channels, a transfer-channel adapted to support type between the members and adapted to register with various channels on either member as they are moved.

167. The combination of a member adapted to print by rotary motion and having a plurality of type-holding channels on its surface, a movable storage member opposite the end of the printing member and having a plurality of type-holding channels, and a transfer-channel between said members adapted to register with any channel in one member and at the same time with any channel in the other member.

168. The combination of a rotary printing member having on its surface a plurality of holders for individual assembled type, a storage member having a plurality of type-holders, means for guiding the type from any holder of one member to any holder of the other, and an impression-platen coöperating with the printing member.

169. The combination of a pair of drums with their ends adjacent, each drum having a plurality of holders for individual type, and a guide for type passing from one drum to the other.

170. The combination of a pair of channeled drums with their ends adjacent, said drums being adapted to carry individual type transferable between them, and a platen coöperating with assembled type on one of the drums.

171. The combination of a supply member, a printing member, each adapted to carry individual type transferable from one member to the other, a band of transfer material carried by the printing member and adapted to be in contact with the face of the type thereon or to be removed therefrom to allow the type to be moved from one member to the other.

172. The combination of a member carrying individual assembled type and printing by rolling motion and an inking-ribbon mounted on such member.

173. The combination of a member carrying individual type assembled into words in parallel lines, said member having a curved surface whereby it may print by rolling motion, and an inking-ribbon mounted on such member.

174. The combination of a member carrying individual type assembled into words in parallel lines, said member having a curved surface whereby it may print by rolling motion, an inking-ribbon mounted on such member, and means governed by the movement of the member for feeding the ribbon transversely of the type.

175. The combination with a platen and a rotary printing member having a plurality of type-holders, of a storage member having a plurality of type-holders, a type-guide adapted to lead from one member to the other, type adapted to be transferred along such guide, and an inking-ribbon passing between the printing member and platen.

176. A printing member having a plurality of type-holders, a storage member having a plurality of type-holders, a transfer-guide between the two, each member being adapted to have its presentation to said guide changed, type adapted to be transferred along said guide, a movable platen for the printing member, and an inking-ribbon passing between the platen and printing member.

177. A movable printing member having a plurality of type-holding channels, a storage member having a plurality of type-holding channels, a transfer-channel between the two whose ends are adapted to register with any channel of either member, respectively, a platen for the printing member, and an inking-ribbon passing between the platen and printing member.

178. A pair of drums placed end to end, each having a plurality of type-holding channels, means for bringing any channel of either drum into coöperation with any channel of the other drum, a platen coöperating with one of the drums, and an inking fabric passing between such drum and platen.

179. A pair of drums placed end to end, each having a plurality of open-ended type-holding channels, a guide for type passing between the drums, means for selecting the channels of the respective drums with open ends of which said type-guide coöperates, a platen coöperating with one of the drums, and an inking fabric passing between such drum and platen.

180. The combination of a printing member having a plurality of type-holders, a storage member having a plurality of type-holders, a type-guide for the transference of type from one member to the other, means for selecting the particular holders of the two members with which such guide may coöperate, a platen coöperating with the printing member, and an inking-ribbon between said member and platen.

181. The combination of a pair of members each having a plurality of open-ended type-holding channels, a transfer-channel between the members adapted to coöperate with the open ends of channels in the two members, a platen coöperating with one of the members, and an inking-ribbon passing between such platen and member.

182. The combination of a pair of movable members each having a plurality of type-holding channels, a transfer-channel between the members adapted to register with various channels on either member as they are moved, a platen coöperating with one of the members, and an inking-ribbon passing between such platen and member.

183. The combination of a member adapted to print by rotary motion and having a plurality of type-holding channels on its surface, a movable storage member opposite the end of the printing member and having a plurality of type-holding channels, a transfer-channel between said members adapted to register with any channel in either member, a platen for said printing member, and an inking-ribbon passing between said platen and printing member.

184. The combination of a rotary printing member having on its surface a plurality of holders for individual assembled type, a storage member having a plurality of type-holders, means for guiding the type from any holder of one member to any holder of the other, an impression-platen coöperating with the printing member, and an inking-ribbon passing between the printing member and platen, and adjustable means for determining the starting-point on the paper of the impression.

185. The combination of a pair of drums with their ends adjacent, each drum having a plurality of holders for individual type, a guide for type passing from one drum to the other, a platen coöperating with one of said drums, and an inking-ribbon passing between the platen and such drum.

186. The combination of a pair of channeled drums with their ends adjacent, said drums being adapted to carry individual type transferable between them, a platen coöperating with one of the drums, and an inking-ribbon passing between said platen and its coöperating drum.

187. The combination with a platen and a rotary printing member having a plurality of type-holders, of a storage member having a plurality of type-holders, a type-guide adapted to lead from one member to the other, type adapted to be transferred along such guide, and an inking-ribbon for the type mounted on and carried by the printing member.

188. A movable printing member having a plurality of type-holding channels, a storage member having a plurality of type-holding channels, a transfer-channel between the two whose ends are adapted to register with any channel of either member, respectively, and an inking-ribbon for the type mounted on and carried by the printing member.

189. A pair of drums placed end to end, each having a plurality of open-ended type-holding channels, means for bringing any channel of either drum into coöperation with any channel of the other drum, a platen for one of the drums, and an inking-ribbon mounted on such drum.

190. A pair of drums placed end to end, each having a plurality of type-holding channels, a guide for type passing between the same, means for selecting the channels of the respective drums with which said type-guide coöperates, and an inking-ribbon mounted on one of the drums.

191. A pair of drums placed end to end, each having a plurality of type-holding channels, a guide for type passing between the drums, means for selecting the channels of the respective drums with which said type-guide coöperates, an inking-ribbon mounted on one of the drums, and means governed by the rotation of such drum for feeding said ribbon transversely of the type.

192. The combination of a printing member having a plurality of type-holders, a storage member having a plurality of type-holders, a type-guide for the transference of type from one member to the other, means for selecting the particular holders of the two members with which such guide may coöperate, and an inking-ribbon mounted on the printing member.

193. The combination of a pair of members each having a purality of open-ended type-holding channels, a transfer-channel between the members adapted to coöperate with the open ends of channels in the two members, and an inking-ribbon adapted to be mounted on one of the members and adapted to leave that member uncovered for the assemblage of type thereon or to cover such type in printing.

194. The combination of a member adapted to print by rotary motion and having a plurality of type-holding channels on its surface, a movable storage member opposite the end of the printing member and having a plurality of type-holding channels, a transfer-channel between said members adapted to register with any channel in either member, a pair of spools set in the printing member, and an inking-ribbon carried by said spools and adapted to pass across the type on the printing member.

195. The combination of a pair of movable members each having a plurality of type-holding channels, a transfer-channel between the members adapted to register with various channels on either member as they are moved, a platen coöperating with one of the members, an inking-ribbon passing between such platen and the member last mentioned, and means for feeding the paper between said ribbon and platen, said last-mentioned means being adjustable, whereby the paper may be accommodated to the type-matter in the printing member.

196. The combination of a pair of channeled drums with their ends adjacent, said drums being adapted to carry individual type transferable between them, a platen coöperating with one of the drums, an inking-ribbon passing between said platen and its coöperating drum, and means for feeding the paper between said ribbon and platen, said last-mentioned means being adjustable, whereby the paper may be accommodated to the type-matter in the printing-drum.

197. The combination of a pair of channeled drums with their ends adjacent, said drums being adapted to carry individual type transferable between them, a platen coöperating with one of the drums, and an inking-ribbon mounted on and carried by the drum with which the platen coöperates.

198. The combination of two drums each adapted to carry type, a type-guide between them by which type may be transferred, and mechanism for holding one of the drums against movement during such transfer.

199. The combination of a pair of channeled drums with their ends adjacent, said drums being adapted to carry individual type transferable between them, a platen coöperating with one of the drums, and means for temporarily holding that drum with which the platen coöperates during transfer of type to such drum.

200. The combination of a rotary printing-drum, a crank at one end for rotating it, a storage member at the other end adapted to carry type which may be transferred to the drum, and an inking fabric carried by the drum.

201. A drum formed to carry rows of individual type on its face, a coöperating platen below the drum, a driving-crank at one end of the drum, and a storage member at the other end of the drum.

202. A drum formed to carry rows of individual type on its face, a driving-crank at one end of the drum, a storage member formed to carry rows of individual type at the other end of the drum, and means whereby type may be transferred from the storage member to the drum.

203. A drum formed to carry rows of individual type on its face, a driving-crank at one end of the drum, a storage member at the other end, and a type-channel adapted to support type between the storage member and drum.

204. The combination of a pair of upright frame members, a rotary type-carrying drum journaled between said members, a platen below said drum, a crank on the outer side of one of said frame members for rotating said drum, a storage member on the outer side of the other frame member, said storage member being adapted to carry rows of type transferable to the printing-drum.

205. The combination of a rotary printing-drum, a crank at one end for rotating it and a storage member at the other end adapted to carry type which may be transferred to the drum, a platen coöperating with the printing-drum, and an inking-ribbon passing between the printing-drum and platen.

206. A drum formed to carry rows of individual type on its face, a driving-crank at one end of the drum, a storage member formed to carry rows of individual type at the other end of the drum, means whereby type may be transferred from the storage member to the drum, a platen coöperating with said drum, an inking-ribbon adapted to pass between the drum and platen, and means for feeding the paper to be printed between the platen and ribbon.

207. The combination of a supply member, a printing member, and feed-racks for feeding type from either member to the other.

208. The combination of a supply member having type-holders, a printing member having type-holders, a pair of feed-racks extending along such members, and mechanism for moving each rack in a direction to advance the type in the corresponding member toward the other member.

209. The combination of a printing member having means for carrying rows of individual type, a movable storage member, type transferable from one member to the other, and means for indicating the character of the type in the storage member in position to be transferred.

210. A type-carrying member and an impression-platen, one of which is adapted to turn on an axis while printing and the other of which has concurrent coöperative movement said type being held loosely and individually on said type-carrying member, and an inking-ribbon mounted on the type-carrying member.

211. A type-carrying member and an impression-platen, one of which is adapted to turn on an axis while printing and the other of which has concurrent coöperative movement said type being held loosely and individually on said type-carrying member, a spool mounted on the type-carrying member and an inking-ribbon having one end wound on such spool.

212. The combination in a unitary machine of a printing couple, one member of which is adapted to turn on an axis while printing, an inked fabric adapted to pass between the members of the couple, whereby the impression is produced through the fabric and by continuous rolling contact, and mechanism for assembling type on one member of the couple and for distributing type therefrom.

213. In a combined setting, distributing and printing machine, the combination of a font of individual type continuously carried by the machine, a storage member, a printing member, mechanism forming a part of the machine for transferring type from either member to the other, a platen coöperating with the printing member to produce therewith a printing couple, one member of said couple being adapted to turn on an axis while printing and the other member concurrently moving in coöperation therewith, and an inked fabric adapted to pass between the members of the couple whereby the printing is effected through the fabric and by rolling-impression.

214. A rotary drum having on its surface parallel linear type-holders, type adapted to be assembled into a page of lines of words in said holders, a platen with which said drum may coöperate while rotating, a printing fabric passing between the drum and platen, such fabric being of a width corresponding to the length of the lines and of a length greater than the periphery of said drum, and means for carrying a wound-up end of said fabric.

215. A type-carrying drum adapted to print by rotary movement and having a series of parallel longitudinal type-holders, an inking-ribbon of a width as great as the length of the lines of type on said drum, the ribbon being adapted to be moved with the type while printing, and means for shifting the ribbon while the type is not printing.

216. The combination of a movable platen and a type-carrying member which prints by rolling contact therewith and is adapted to carry parallel rows of individual assembled type, and an inking-ribbon mounted on such member and covering a page form of type thereon.

217. The combination of a printing couple, one member of which is rotary and carries on its surface parallel rows of individual type assembled into page-form, spools carried on such member, and an inking-ribbon mounted on such spools and covering such page.

218. The combination of a type-carrying member which prints by movement about an axis and is adapted to carry parallel rows of individual type assembled into page form on the member, and an inking-ribbon extending across the type and having its ends carried by such member beyond the extremes of such page-form.

219. A rotary drum having on its surface means for carrying a page-form of parallel lines of individual type, an inking-ribbon mounted on such drum and extending part way around it and covering the type thereon, the ends of the ribbon being separately carried by the drum at points beyond the opposite ends of such page-form.

220. A printing member having on its surface carriers for individual type assembled into parallel lines of words, said type being held loosely and individually on said type-carrying member a platen with which such member may coöperate making therewith a printing-couple one member of which turns on an axis while the other is moving in coöperation therewith, a printing fabric a page wide passing between the member and platen, and a spool which carries one end of said fabric and around which the fabric is wound, said spool being rotatably mounted on an axis parallel with the axis first mentioned.

221. A rotatable member having on its surface a plurality of carriers for individual type assembled into parallel lines of words, a coöperating platen, whereby such member is adapted to print by rotary motion, a transfer fabric arranged to travel in unison with the type while printing and be impressed on one side by the type and thereby print on the opposite side, said transfer fabric having a width as great as the length of the lines on the member, and means mounted on the member for carrying the ends of said fabric.

222. The combination of a member carrying individual assembled type and printing by rolling motion, an inking-ribbon extending across such type, and means mounted on the member for holding the ends of the ribbon.

223. The combination of a member carrying individual type assembled into a page-form of parallel lines of words, said member having a curved surface whereby it may print by rolling motion, an inking-ribbon a page wide, and means for carrying the ends of the ribbon mounted on such member.

224. The combination of a movable member adapted to carry on its surface individual type assembled in a page-form of parallel lines of words, a ribbon of a width sufficient to cover such page, means for carrying an end of the ribbon, said means being mounted in a recess in the movable member beyond the end of such page, a platen, and means for feeding the ribbon when the type on the movable member are out of coöperation with the platen, substantially as described.

225. A printing-drum having on a portion of its surface parallel, longitudinal type-holders and having a recess between the ends of such portion, a transfer fabric of a width sufficient to cover a page of type mounted in lines on such holders, and means within said recess for carrying the ends of said fabric.

226. The combination of a rotatable drum having on its surface carriers for individual type assembled into a page of parallel rows of words, a platen with which said drum may coöperate while rotating, a fabric of a width as great as said page and passing between the drum and platen, means for feeding paper to be printed between the drum and platen, and adjustable means for determining the time of starting the feeding of the paper, whereby the paper may be properly timed with reference to the matter on the drum.

227. The combination of a type-carrying member mounted to turn on a fixed axis and print by such movement, a platen coöperating with said member, a transfer fabric passing between the member and platen, means for feeding paper between the member and platen, and movable means for governing the time of starting the paper.

228. The combination of a printing member, a supply member, mechanism for transferring type from one to the other, said mechanism being operated by an endwise shift to one of said members.

229. The combination of a rotary printing member, a movable supply member, mechanism for transferring type from the supply member to the printing member, said mechanism being actuated by a movement of the supply member.

230. The combination of a rotary printing member, an independently-rotatable supply member, transfer mechanism for transferring type from either member to the other, and means whereby said transfer mechanism may be operated by an endwise movement of the supply member.

231. The combination of a printing-drum adapted to carry on its surface parallel rows of individual assembled type, a pair of spools set into a recess in said drum, a ribbon mounted on said spools and passing around said drum, a platen with which the drum coöperates, and means for turning one of the spools on its axis during a non-printing portion of a rotation of the drum.

232. The combination of a member adapted to turn on an axis and formed to carry rows of individual assembled type, a platen coöperating with assembled type on said member, driving mechanism at one end of such member, and a storage member at the other end of such member.

233. The combination of a pair of type-holding members mounted end to end and each adapted to be turned about an axis, type transferable between the members, independent means at the distant ends of the members for so turning them, and a platen coöperating with one of the members during such turning.

234. The combination of a pair of drums mounted end to end in a unitary machine and each adapted to carry rows of individual type, means at the ends of such machine for rotating each drum independently, and a platen coöperating with one of the drums.

235. The combination of a pair of drums placed end to end and each adapted to carry rows of individual type, means on the distant end of each drum for rotating it, a platen coöperating with one of the drums, and mechanism for transferring type from either drum to the other.

236. The combination of a pair of drums placed end to end and each adapted to carry rows of individual type, means at the distant end of each drum for rotating it, a platen coöperating with one of the drums, and an inking-ribbon carried by the drum with which the platen coöperates.

237. The combination of a pair of rotatable drums placed end to end and each adapted to carry individual type, and means at the distant ends of the drums for independently rotating them, type transferable between the drums, mechanism for effecting such transfer, a platen coöperating with one of the drums, and an inking-ribbon mounted on said last-mentioned drum and adapted to pass between it and the platen.

238. A pair of members each provided with a plurality of type-holders, type transferable from holder to holder, one of said members being adapted to turn about an axis, an impression device coöperating with assembled type on one of said members, and an inking-ribbon movable with the type when in apposition to the impression device, whereby said type may be assembled, printed from, and distributed while in the machine.

239. A pair of members each provided with a plurality of type-holders, type transferable from holder to holder, one of said members being adapted to turn about an axis, an impression device coöperating with assembled type on one of said members, and an inking-ribbon mounted on the member which coöperates with the impression device, said ribbon being adapted to extend over the type of such member and being removable to allow assemblage of such type, whereby said type may be assembled, printed from, and distributed while in the machine.

240. A pair of members each provided with a plurality of type-holders, type transferable from holder to holder, one of said members being adapted to turn about an axis, an impression device coöperating with assembled type on one of said members, an inking-ribbon adapted to pass between the impression device and the member coöperating therewith, and means for feeding said ribbon to present a fresh face to the type, whereby said type may be assembled, printed from, and distributed while in the machine.

241. A pair of members each provided with a plurality of type-holders, type transferable from holder to holder, one of said members being adapted to turn about an axis, an impression device coöperating with assembled type on one of said members, the member which coöperates with the impression device having a recess, an inking-ribbon adapted to extend across the type on such member, and means mounted in the recess for holding the ends of the ribbon, whereby said type may be assembled, printed from, and distributed while in the machine.

242. A pair of members each provided with a plurality of type-holders, type transferable from holder to holder, one of said members being adapted to turn about an axis, an impression device coöperating with assembled type on one of said members, the member which coöperates with the impression device having a recess, a pair of ribbon-spools mounted in said recess, a ribbon mounted on said spools and adapted to extend from one spool to the other across the type on such member, and means for rotating one of the spools when the recess is passing the impression device, whereby said type may be assembled, printed from, and distributed while in the machine.

243. A pair of members each provided with a plurality of type-holders, type transferable from holder to holder, mechanism for effecting such transfer to assemble or distribute type, one of said members being adapted to turn about an axis, an impression device coöperating with type thus assembled on one of said members, and an inking-ribbon movable with the type when in apposition to the impression device, whereby said type may be assembled, printed from, and distributed while in the machine.

244. A pair of members each provided with a plurality of type-holders, type transferable from holder to holder, manually-operated mechanism for effecting such transfer, one of said members being adapted to turn about an axis, an impression device coöperating with assembled type on one of said members, and an inking-ribbon mounted on the member which coöperates with the impression device, said ribbon being adapted to extend over the type of such member and being removable to allow said manually-operated mechanism to act on the type on such member, whereby said type may be assembled, printed from, and distributed while in the machine.

245. A pair of members each provided with a plurality of type-holders, type transferable from holder to holder, mechanism for effecting such transfer, one of said members being adapted to turn about an axis, an impression device coöperating with type on one of said members, an inking-ribbon adapted to pass between the impression device and the member coöperating therewith, and means for feeding said ribbon to present a fresh face to the type.

246. A pair of members each provided with a plurality of type-holders, type transferable from holder to holder, mechanism for effecting such transfer, one of said members being adapted to turn about an axis, an impression device coöperating with type on one of said members, the member which coöperates with the impression device having a recess, an inking-ribbon adapted to extend across the type on such member, and means mounted in the recess for holding the ends of the ribbon.

247. A pair of members each provided with a plurality of type-holders, type transferable from holder to holder, mechanism for effecting such transfer, one of said members being rotatable, an impression device coöperating with said rotatable member, said rotatable member having a recess, a pair of ribbon-spools mounted in said recess, a ribbon mounted on said spools and adapted to extend from one spool to the other across the type on such member, and means for automatically rotating one of the spools when the recess is passing the impression device.

248. In a duplicating-machine, the combination of a drum, means for rotating it, means for holding individual type in lines upon its surface, a movable platen suitable to receive the impression of the type, a web of transfer material having its ends mounted on the drum and being adapted to pass across the type thereon and move with the type in coöperation with the impression-platen, means for periodically moving said web across the face of the type to present a fresh portion of the web thereto, and adjustable means to govern the time of starting the printing impression with reference to the type matter on the drum.

249. In a duplicating-machine, the combination of a pair of channeled drums placed end to end, a font of type, the different individuals of which are of the same thickness, mechanism for feeding such type from one drum to the other by successive movements which are individually equal to the thickness of a type, a platen coöperating with one of the drums, an inking-ribbon adapted to pass between the platen and the drum cooperating therewith, and means for automatically and periodically giving said ribbon movement other than its movement with the drum while printing.

250. The combination in a unitary machine, of a rotary printing-drum, means at one end of the same for rotating it, a storage member at the other end of the drum, and a platen coöperating with assembled type on the periphery of the drum.

251. The combination in a unitary machine of a rotary printing-drum, means at one end of the same for rotating it, a storage-drum at the other end of the printing-drum, a platen coöperating with the periphery of the printing-drum, feed-racks extending along the drums respectively, and means for moving either rack toward the corresponding drum and along it to feed the type in that drum toward the other drum.

252. The combination of a supply member, another type-holding member, a font of type, the different individuals of which are of the same thickness, and means for feeding type from either member to the other by successive movements individually equal to the thickness of a type.

253. A printing member having a plurality of type-holding channels, a storage member having a plurality of type-holding channels, a transfer-channel between the two, there being provisions for relative movement between the printing member and transfer-channel, and relative movement between the storage member and transfer-channel, whereby said transfer-channel is adapted to register with any channel of either member respectively.

254. The combination of a pair of drums placed end to end, each drum being formed with longitudinal type-holders, a font of type, the different individuals of which are of the same thickness, mechanism for feeding type from either drum to the other by successive movements which are individually equal to the thickness of a type, means for independently rotating the two drums, an impression-platen coöperating with one of the drums, an inking-ribbon adapted to pass between the platen and the drum which cooperates with it, and automatically-acting means to feed said ribbon transversely of the line of contact between the platen and said coöperating drum.

255. The combination of a supply member and a printing member, each provided with longitudinal type-holders, a font of type, mechanism for feeding type one at a time from either member to the other, driving mechanism for turning the printing member about an axis, an impression-platen coöperating with said printing member, an inking-ribbon adapted to pass between the platen and the printing member, automatically-acting means to feed said ribbon transversely of the line of contact between the platen and said printing member, and means driven by the driving mechanism of the printing member for feeding paper between the platen and such member, the said means being adjustable to compensate for different positions of the printing matter on the printing member.

256. In a combined setting and distributing and printing machine, the combination of a font of individual type which form a permanent part of the machine and are grooved on their sides, of a supply mechanism and a rotary printing mechanism, each having rails with overhanging edges providing channels which such grooved type occupy, means forming a permanent part of the machine and adapted to convey type from one mechanism to the other, and a platen coöperating with the printing mechanism while rotating.

257. In a combined setting, distributing and printing machine, the combination of a font of individual type continuously carried by the machine, a storage member, a printing member, mechanism forming a part of the machine for transferring type from either member to the other and a platen cooperating with the printing member to produce therewith a printing-couple, one member of said couple being adapted to turn on an axis while printing and the other member concurrently moving in coöperation therewith, whereby the printing is effected by rolling impression.

258. In a duplicating-machine, in combination, mechanism for carrying a supply of type, printing mechanism adapted also to carry type, each mechanism having open-ended type-channels, a passage-way therebetween, and a limiting-wall opposite the ends of the various channels of the supply mechanism, such wall being interrupted at such passage-way.

259. The combination of printing mechanism, storage mechanism, mechanism for transferring type from either of said mechanisms to the other, and means for preventing an excessive movement of the transferring mechanism.

260. The combination in a unitary machine of a platen, a coöperating printing mechanism, mechanism for advancing a line of type to or from the printing mechanism and adjustable mechanism for preventing an excessive movement of the advancing mechanism.

261. The combination of a supply member, and a printing member, a type-channel leading from one to the other, mechanism for advancing a line of type in either of said members so that the forward end of the line may pass into said channel, and means for limiting the normal movement to one type at a time.

262. The combination in a unitary machine, of a platen, coöperating printing mechanism, mechanism for advancing a line of type to or from the printing mechanism, mechanism for preventing an excessive movement of the advancing mechanism, and manual mechanism for operating the advancing mechanism.

263. In a duplicating-machine, the combination with a font of type the different individuals of which are of the same thickness, of mechanism for carrying a supply of such type, printing mechanism adapted also to carry type, feeding mechanism adapted to convey type from either mechanism to the other and present it with its character standing in the same direction, and means adapted to limit the normal feeding movement to a distance equal to the thickness of a type.

264. In a duplicating-machine, in combination, mechanism for carrying a supply of type, printing mechanism adapted also to carry type, feeding mechanism adapted to convey type from one mechanism to the other with its character standing in the same direction, and adjustable means to prevent excessive movement of the feeding mechanism.

265. The combination in a unitary machine of a printing-couple, one member of which is adapted to turn on an axis while printing, whereby the impression is produced by continuous rolling contact, and mechanism for assembling type on one member of the couple and for distributing type therefrom.

266. The combination of a channeled storage member, a channeled printing member, a type-channel between them adapted to communicate therewith and adapted to support a plurality of individual type, and means for engaging the rear end of a line of type in one of said members and moving with it a distance equal to the thickness of a type to cause the forward type in such line to pass into the type-channel.

267. The combination of supply mechanism, printing mechanism, feeding mechanism adapted to feed type from either of said mechanisms toward the other, and means adapted to limit the movement of the feeding mechanism to a distance equal to the thickness of a type.

268. A type-carrying member a platen which coöperates to print by rolling impression and an inking-ribbon having separated ends which are mounted on such member.

269. A type-carrying member which prints by rotary movement and an inking-ribbon having one end at least removably carried by the type-carrying member to allow removal of the ribbon for installing the type on the member.

270. A printing-couple comprising a printing member and an impression-platen, one of which is rotary, and an inking-ribbon mounted on the printing member and movable with it and having one end removably carried by the printing member, whereby the ribbon may be displaced to allow installation of the type.

271. In a printing-couple comprising a printing member and an impression-platen, one of which is rotary, a pair of ribbon-spools carried by the printing member, a ribbon mounted on said spools and adapted to extend across the face of the type on said member and move with such type in coöperation with the platen, and means for actuating one of said spools to feed the ribbon.

272. In a duplicating-machine, the combination of a member adapted to carry on its surface parallel rows of individual type, whereby a page of matter may be carried on said member, a platen coöperating with such member and making therewith a printing-couple, one member of said couple having rotary movement while printing, and a transfer fabric of a width sufficient to cover the page of type, said fabric having separated ends which are carried by the member which carries the type, said fabric being arranged to lie between the members of the couple and be impressed on one side by the type and thereby print on the opposite side.

273. In a duplicating-machine, the combination of a member adapted to carry on its surface parallel rows of individual type, whereby a page of matter may be carried on said member, a platen coöperating with such member and making therewith a printing-couple, one member of said couple having rotary movement while printing, a transfer fabric of a width sufficient to cover the page of type matter, a pair of spools rotatably mounted on the member which carries the type, said spools carrying the ends of the transfer fabric, the fabric being arranged to lie between the members of the couple and be impressed on one side by the type and thereby print on the opposite side, and means periodically actuated for giving partial rotations to one of said spools.

274. A printing-couple comprising a type-carrying member and an impression-platen, one of which has rotary movement while printing, said type-carrying member having a series of parallel type-holders, an inking-ribbon of a width as great as a page of type matter carried on said member, said ribbon being adapted to be moved with the type while printing, and means for shifting the ribbon while the type is not printing.

275. A printing-couple comprising a type-carrying member and an impression-platen, one of which has rotary movement and the other movement in a substantial tangential plane, an inking-ribbon adapted to extend across the type on the type-carrying member and be moved with said member, means mounted on the type-carrying member for carrying the ends of said ribbon, and mechanism for shifting the ribbon while the type is not printing.

276. The combination of a printing-couple comprising a printing member and a platen, both of which are movable during printing and one of which is adapted to turn on an axis at such time, said member being adapted to carry on its surface individual type assembled in a page form in parallel lines of words, a ribbon of a width sufficient to cover such page, means for carrying the ends of the ribbon, said means being mounted on the printing member.

277. The combination of a printing-couple, one member of which is rotary, means for carrying individual type on one member of the couple, an inked fabric adapted to pass between the members of the couple and means on the member which carries the type for carrying the ends of the fabric, at least one of such fabric-carrying means being removable to allow the installation of the type.

278. The combination of a movable printing member, a movable and coöperating platen member, one of said members being rotary and the other flat, one of said members being adapted to carry type assembled in page form, and a ribbon a page wide carried by the type-carrying member and extending across the type thereon.

279. The combination of a movable printing member, a movable and coöperating platen member, one of said members being rotary and the other flat, one of said members being adapted to carry type assembled in page form, a pair of spools rotatably carried by the type-carrying member, a ribbon mounted on said spools, and means for automatically and periodically rotating one of said spools, consequent upon the movement of the printing member.

280. The combination of a printing-couple, one member of which is adapted to carry individual type, mechanism for assembling such type on said member, and an inking-ribbon mounted on said member and having one end at least removably carried thereby, whereby the ribbon may be displaced to allow the assemblage of the type.

281. The combination in a unitary machine, of a font of individual type forming a permanent part of the machine, means forming a permanent part of the machine for assembling characters thereon in parallel lines of desired words, a printing-couple, one member of which is rotary, means on one member of the couple for carrying such assembled characters, and means for distributing such characters without removal from the machine.

282. The combination in a unitary structure, of a printing-couple, one member of which is rotary and the other flat, a font of individual type forming a permanent part of the machine, means forming a permanent part of the machine for assembling characters into parallel lines of desired words on one member of the printing-couple, means for printing from such type by operation of the couple, and means for distributing such characters without removal from the machine.

283. A storage member provided with a plurality of holders for carrying individual type arranged with different holders according to the different characters, a printing-couple one member of which is rotary and the other flat, one member of such couple being provided with a plurality of type-holders parallel with each other, a font of individual type having usual letters, characters and figures and transferable from the holders of the storage member to those of the printing-couple, an inking fabric carried by the printing member and movable therewith, and means for feeding the fabric between printing impressions, whereby said type may be assembled, printed from and distributed while in the machine.

284. The combination with a type-storage member, of a printing-couple, one member of which is rotary, means for carrying the individual type on one member of the couple, means for transferring type from the storage member to such member of the couple, an inked fabric adapted to pass between the members of the couple and having one end at least removably carried by the member which carries the type, whereby the fabric may be displaced to allow the assemblage of the type and may be put in place to allow the printing to be effected.

285. The combination of a printing-couple comprising a type-carrying member and a platen, one of which has rotary movement while printing, a transfer fabric passing between the member and platen, means for feeding paper between the member and platen, and movable mechanism for governing the time of starting the paper.

286. The combination, of a printing-couple comprising a type-carrying member and a platen, the type being held loosely and individually on said type-carrying member, an inked fabric adapted to pass between the members of the couple and mounted on said type-carrying member, means for feeding paper between the members of such couple, and means for removing the paper after the printing is accomplished, substantially as described.

287. The combination of a printing-couple comprising a printing member and an impression-platen, one of which is rotary while printing, mechanism for assembling type on the printing member, an inked fabric adapted to move between the printing member and the impression-platen during the impression, whereby the paper may be printed by continuous rolling motion, and means for removing such paper after it is printed.

HARRY C. GAMMETER.

Witnesses:
ALBERT H. BATES,
E. L. THURSTON.